March 7, 1950  M. DE GROOTE ET AL  2,499,366
CHEMICAL MANUFACTURE
Filed Feb. 16, 1948  2 Sheets-Sheet 1
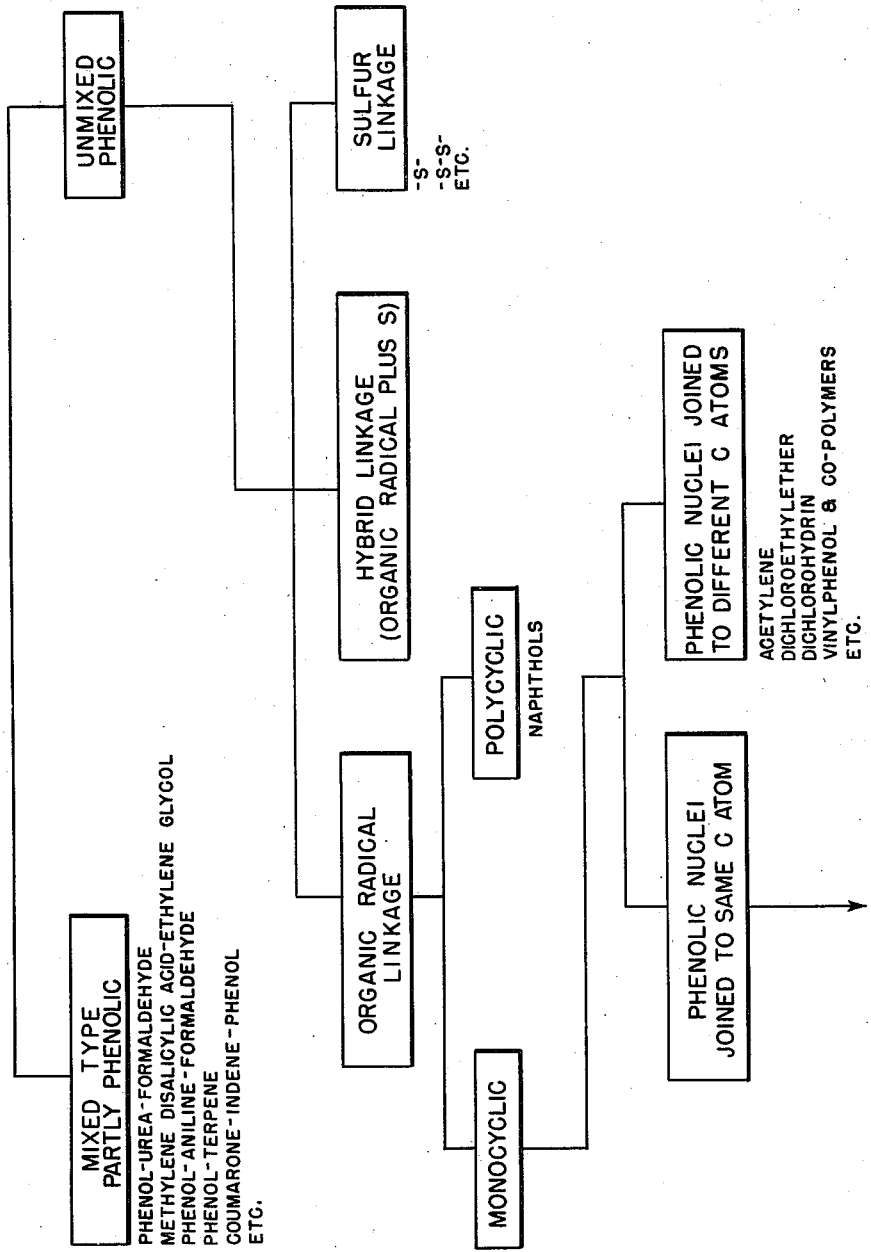
INVENTORS
MELVIN DE GROOTE AND
BERNHARD KEISER
BY Wells L. Church
ATTORNEY March 7, 1950     M. DE GROOTE ET AL     2,499,366
CHEMICAL MANUFACTURE
Filed Feb. 16, 1948     2 Sheets-Sheet 2
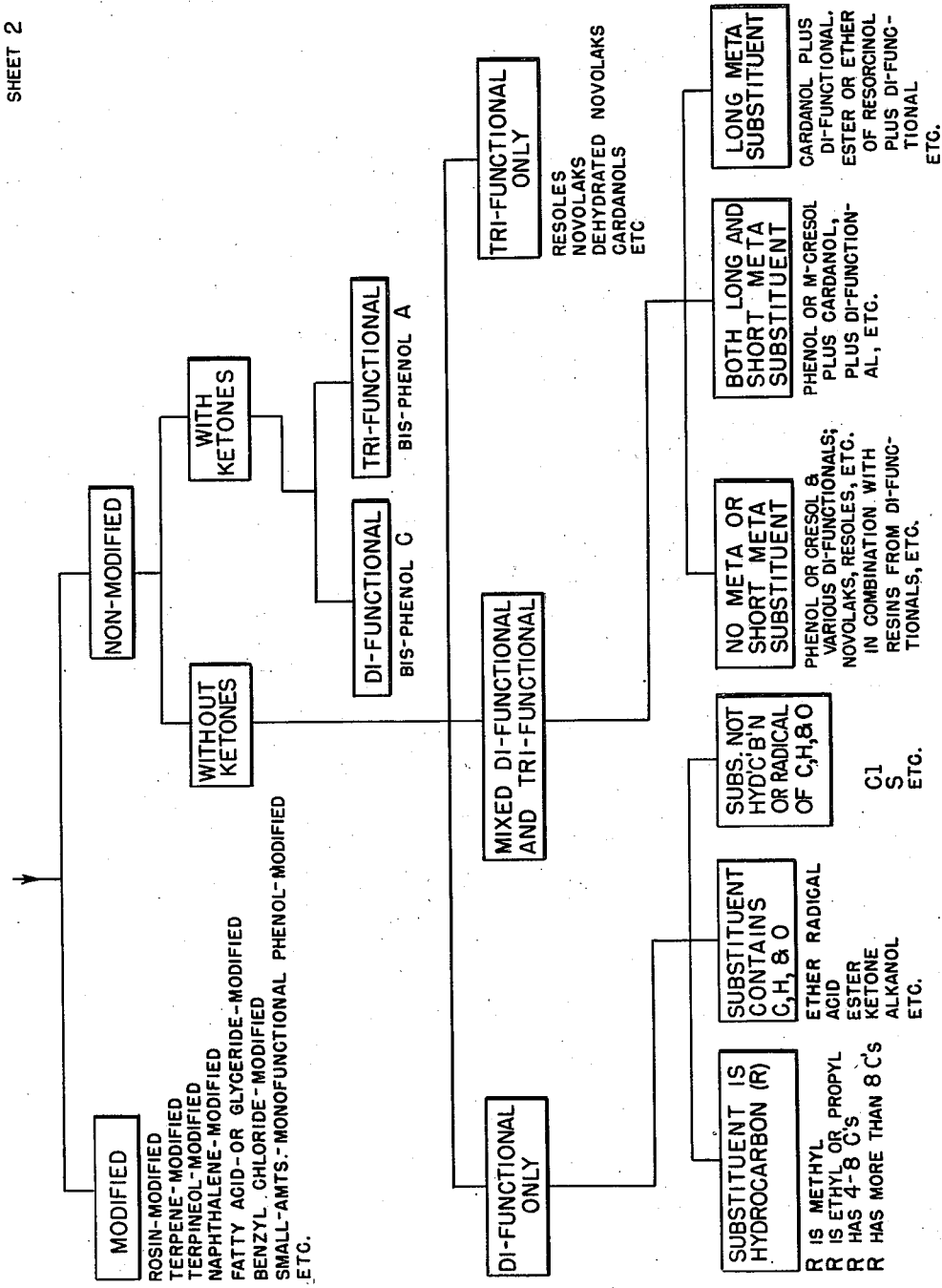
INVENTORS
MELVIN DE GROOTE AND
BERNHARD KEISER
BY Wells L. Church
ATTORNEY Patented Mar. 7, 1950

2,499,366

UNITED STATES PATENT OFFICE 2,499,366

CHEMICAL MANUFACTURE

Melvin De Groote, University City, and Bernhard Keiser, Webster Groves, Mo., assignors to Petrolite Corporation, Ltd., Wilmington, Del., a corporation of Delaware Application February 16, 1948, Serial No. 8,723
In Venezuela March 7, 1947

9 Claims. (Cl. 252—331)

This invention relates to processes and procedures for preventing, breaking, or resolving emulsions of the water-in-oil type, and particularly petroleum emulsions. This application is a continuation-in-part of co-pending applications, Serial Nos. 518,660 and 518,661, filed January 17, 1944; Serial Nos. 666,816, 666,817, 666,818 and 666,821, filed May 2, 1946; Serial Nos. 727,282 and 727,283, filed February 7, 1947, Serial Nos. 751,605, 751,610 and 751,611, filed May 31, 1947, all now abandoned.

New chemical products or compounds as well as the application of such chemical compounds, products, and the like, in various other arts and industries, along with methods for manufacturing said new chemical products or compounds which are of outstanding value in demulsification, described herein are described and claimed in applications, Serial Nos. 751,623 and 751,620, filed May 31, 1947, both now abandoned, and also our co-pending applications, Serial No. 8,731, filed February 16, 1948, Serial No. 42,134, filed August 2, 1948 and Serial No. 8,729, filed February 16, 1948.

Our invention provides an economical and rapid process for resolving petroleum emulsions of the water-in-oil type that are commonly referred to as "cut oil," "roily oil," "emulsified oil," etc., and which comprises fine droplets of naturally occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification under the conditions just mentioned are of significant value in removing impurities, particularly inorganic salts from pipeline oil.

Demulsification as contemplated in the present application includes the preventive step of commingling the demulsifier with the aqueous component which would or might subsequently become either phase of the emulsion in the absence of such precautionary measure. Similarly, such demulsifier may be mixed with the hydrocarbon component.

In our various co-pending applications above referred to we have described certain new products or compositions of matter which are of unusual value in certain industrial applications requiring the use of products or compounds showing surface activity. We have found that if solvent-soluble resins are prepared from phenols and other reagents supplying resin-forming bridging radicals with or without the use of additional resinogens and with or without the use of modifying agents, subsequent oxyalkylation, and specifically oxyethylation, yields products of unusual value for demulsification purposes provided that oxyalkylation is continued to the degree that hydrophile properties are imparted to the compound. The products must be derived from solvent-soluble resins, and must have hydrophile property.

Attention is directed to twelve co-pending applications:

(1) In respect to the use of oxyalkylated phenolaldehyde resins with the proviso that the phenolic nucleus has a hydrocarbon substituent with 4 to 8 carbon atoms, we refer to our co-pending application for patent, Serial No. 727,282 filed February 7, 1947 (abandoned).

(2) In respect to the same products as new compositions or as new products valuable for various purposes in addition to demulsification, attention is directed to our co-pending application, Serial No. 751,619, filed May 31, 1947 (abandoned).

(3) In respect to the use of oxyalkylated phenolaldehyde resins with the proviso that the phenolic nucleus has a hydrocarbon substituent with 9 to 18 carbon atoms, we refer to our co-pending application, Serial No. 751,608, filed May 31, 1947 (abandoned).

(4) In respect to the same products as new compositions or as new products valuable for various purposes in addition to demulsification, attention is directed to our co-pending application, Serial No. 751,618 filed May 31, 1947 (abandoned).

(5) In respect to the use of oxyalkylated phenolaldehyde resins with the proviso that the phenolic nucleus has a hydrocarbon substituent with at least 2 and not more than 3 carbon atoms, we refer to our co-pending application for patent, Serial No. 751,606, filed May 31, 1947 (abandoned).

(6) In respect to the same products as new compositions or as new products valuable for various purposes in addition to demulsification, attention is directed to our co-pending application, Serial No. 751,617, filed May 31, 1947 (abandoned).

(7) In respect to the use of oxyalkylated resins derived from phenolic reactants, one may additionally employ as phenolic reactants cresols, xylenols, and substituted phenols in which the substituent has 19 to 24 carbon atoms. In connection with the use of these compounds as demulsifying agents, attention is directed to our co-pending application, Serial No. 751,610 filed May 31, 1947 (abandoned).

(8) In respect to the same products as new compositions or as new products valuable for various purposes in addition to demulsification, attention is directed to our co-pending application, Serial No. 751,623, filed May 31, 1947 (abandoned).

(9) In respect to the use of oxyalkylated phenolaldehyde resins with the proviso that the phenolic nucleus has a hydrocarbon substituent with at least 2 and not more than 24 carbon atoms, and with particular reference to the use of products from mixtures in which phenols having 4 to 8 carbon atoms in the substituent position are mixed with phenols having 2 to 3 or 9 to 24 carbon atoms, reference is made to our co-pending application, Serial No. 8,728 filed February 16, 1948.

(10) In respect to the same products as new compositions or as new products valuable for various purposes in addition to demulsification, attention is directed to our co-pending application Serial No. 8,729 filed February 16, 1948.

(11) In respect to the use of oxyalkylated phenolaldehyde resins with the proviso that such demulsifying agents are derived by the aldehyde resinification of difunctional phenols without limiting the nature of the substituent which renders the phenol difunctional (for instance, it may be chlorine or may be a radical containing oxygen or nitrogen in addition to carbon and hydrogen) reference is made to our co-pending application, Serial No. 8,724, filed February 16, 1948.

(12) In respect to the same products as new compositions or new products valuable for various processes in addition to demulsification, attention is directed to our co-pending application, Serial No. 8,725, filed February 16, 1948.

Oxyalkylation-susceptible, fusible, organic solvent-soluble, water-insoluble resins are readily obtained from difunctional phenols and aldehydes. However, it is feasible and practical to produce such resins from phenols which are not difunctional; to use reagents other than aldehydes to contribute the linking or bridging radical which combines the phenolic nuclei; to make various types of mixed phenolic resins, that is, resins in which some other compound, such as urea, serves as a resinogen along with the phenol; and to make resins from polycyclic phenols in which the phenolic hydroxyl is attached to the polycyclic radical as in the case of naphthol. Such oxyalkylation-susceptible, fusible, organic solvent-soluble, water-insoluble resins can be made readily and cheaply from a variety of materials as hereinafter described and on oxyalkylation, particularly oxyethylation, yield valuable products for use in demulsification. The present invention includes the use, as demulsifiers, of the oxyalkylated products derived in whole or in part from phenols and having oxyalkylation susceptibility attributable, at least in part, to the presence of phenolic hydroxyls.

In light of the fact that the complexity of these resins increases with the variation in reactants employed, and since they need not be obtained from difunctional phenols, we are unable to present even an idealized formula for the structure of this latter type.

Briefly then, the present invention involves the use as a demulsifier of the hydrophile oxyalkylated phenol resin in which the ratio of oxyalkylene groups to phenolic nuclei is at least 2 to 1, and the alkylene radicals of the oxyalkylene groups are ethylene, propylene, butylene, hydroxy propylene or hydroxy butylene corresponding to the alpha-beta alkylene oxides, ethylene oxide, alpha-beta propylene oxide, alpha-beta butylene oxide, glycide and methylglycide, the phenol resin being, prior to oxyalkylation, solvent-soluble and fusible.

More particularly, the present invention involves the use as a demulsifier of a compound having the following characteristics:

(1) Essentially a polymer, probably linear but not necessarily so, having at least 3 and preferably not over 15 or 20 structural units, at least some of which are phenolic. It may have more.

(2) The parent resin polymer being fusible and organic solvent-soluble as hereinafter described.

(3) The parent resin polymer being free from cross-linking or structure which cross-links during the heating incident to the oxyalkylation procedure to an extent sufficient to prevent the possession of hydrophile or sub-surface-active or surface-active properties by the oxyalkylated resin.

(4) Alkyleneoxy groups are introduced at the phenolic hydroxyl positions; with resins having reactive or labile hydrogen atoms in addition to those of the phenolic hydroxyl groups as in salicylic acid resins, alkyleneoxy groups may be introduced at the positions of these atoms also.

(5) The total number of alkyleneoxy radicals introduced must be at least equal to twice the phenolic nuclei.

(6) The number of alkyleneoxy radicals introduced not only must meet the minimum of item (5) above but also must be sufficient to endow the product with sufficient hydrophile property to have emulsifying properties, or be self-emulsifiable or self-dispersible, or the equivalent as hereinafter described. The invention is concerned particularly with the use of sub-surface-active and surface-active compounds.

(7) The parent resin, prior to oxyalkylation, is water-insoluble.

Our work with large numbers of resins has led us to the following general conclusions, which, however, we advance only as tentative because of the complexity of many of the products, and the broad scope of our underlying discovery as to the value, as demulsifiers, of the oxyalkylated phenolic resins.

(a) The property is not uniformly inherent in every phenolic resin structure for the reason that if the bridging methylene group of an aldehyde resin is replaced by sulfur, for example, we have found such compounds to be of lesser value.

(b) Similarly, the property is not uniformly inherent in every phenolic resin for the reason that products derived from chloro-substituted phenols, for example, are of reduced value in comparison with compounds obtained from para-ethylphenol or para-propylphenol, or ortho-ethylphenol or ortho-propylphenol. On the other hand, the products obtained from these phenols are of reduced value for demulsification in comparison with outstanding compounds derived, for example, from difunctional butylphenol, difunctional amylphenol, difunctional octylphenol, difunctional nonylphenol, difunctional decylphenol, difunctional methylphenol, cardanol, hydrogenated cardanol, etc., although of more value than derivatives of ortho or paracresol.

What has been said previously as to demulsifiers obtained from such variety of hydrocarbon substituted phenols, applies in respect to such compounds which are derived from phenols having a substituent which is not hydrocarbon. Thus, if one obtains a resin from butyl, hexyl, octyl, or decylsalicylate, the resulting resin and the oxyalkylated derivatives thereof employed as demulsifiers are rather analogous to compounds derived from difunctional butylphenol, difunctional amylphenol, difunctional octylphenol, etc. The present application includes the use of oxyalkylated derivatives of any oxyalkylation-susceptible, fusible, organic solvent-soluble, water-insoluble resin. In many instances the resin obtained is probably para-substituted. In other instances the resin obtained, although produced from a trifunctional phenol, such as cardanol or hydrogenated cardonal, shows the same properties as those from difunctional nonylphenol, difunctional decylphenol, difunctional dodecylphenol, etc. In these instances it is difficult to attempt to correlate structure in the final resultant for the reason that the structure of the resin is often a matter of conjecture.

(c) We also desire to point out that even if one uses difunctional phenols, the use of an agent other than an aldehyde as the source of the divalent radical which joins the phenolic nuclei, such as ketones, sulfur chlorides, acetylene, substituted acetylene, makes the matter of structure and relationship still more complicated.

(d) We know of no theoretical explanation of the unusual properties of this particular class of compounds and, as a matter of fact, we have not been able to find a satisfactory explanation even after we have prepared and studied several hundred typical compounds.

We have also found that the remarkable properties of the parent materials as demulsifiers persist in derivatives which bear a simple genetic relationship to the parent material, and in fact to the ultimate resin polymer, for instance, in the products obtained by reaction of the oxyalkylated compounds with low molal monocarboxy acids, high molal monocarboxy acids, polycarboxy acids, or their anhydrides, alpha-chloro monocarboxy acids, epichlorohydrin, etc. The derivatives also preferably must be obtained from oxyalkylated products showing at least the necessary hydrophile properties per se.

For convenience, there is attached hereto a chart showing a variety of resins obtained from phenols, useful for preparing products for the practice of this invention.

The following examples, 1a–45a, give specific directions for preparing oxyalkylation-susceptible, water-insoluble, organic solvent-soluble, fusible, phenolic resins which may be used to prepare the products used in the practice of the invention. Additionally, we direct attention to Examples 1a to 362a of our application Serial No. 8,722, filed on the same day this application was filed, as illustrating suitable resins for this purpose. Examples 1b–17b illustrate carrying out the oxyalkylation procedure to produce products useful in the practice of the invention. Again we direct attention to Examples 1b to 76b of our application Serial No. 8,722 as illustrating products useful for the practice of this invention. Examples 1c–3c illustrate the use of the products for demulsification.

*Example 1a*

|  | Grams |
|---|---|
| Para-tertiary butylphenol (1.0 mole) | 150 |
| Formaldehyde 37% (1.0 mole) | 81 |
| Concentrated HCl | 1.5 |
| Monoalkyl ($C_{10}$–$C_{20}$, principally $C_{12}$–$C_{14}$) benzene monosulfonic acid sodium salt | 0.8 |
| Xylene | 100 |

(Examples of alkylaryl sulfonic acids which serve as catalysts and as emulsifiers particularly in the form of sodium salts include the following:

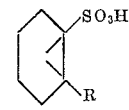

R is an alkyl hydrocarbon radical having 12–14 carbon atoms.

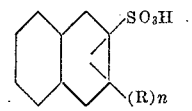

R is an alkyl radical having 3–12 carbon atoms and $n$ represents the numeral 3, 2, or 1, usually 2, in such instances where R contains less than 8 carbon atoms.

With respect to alkylaryl sulfonic acids or the sodium salts, we have employed a monoalkylated benzene monosulfonic acid or the sodium salt thereof wherein the alkyl group contains 10 to 14 carbon atoms. We have found equally effective and interchangeable the following specific sulfonic acids or their sodium salts: A mixture of di- and tripropylated naphthalene monosulfonic acid; diamylated naphthalene monosulfonic acid; and nonyl naphthalene monosulfonic acid.)

The equipment used was a conventional two-piece laboratory resin pot. The cover part of the equipment had four openings: One for reflux condenser; one for the stirring device; one for a separatory funnel or other means of adding reactants; and a thermometer well. In the manipulation employed, the separatory funnel insert for adding reactants was not used. The device was equipped with a combination reflux and water-trap apparatus so that the single piece of apparatus could be used as either a reflux condenser or a water trap, depending on the position of the three-way glass stopcock. This permitted convenient withdrawal of water from the water trap. The equipment, furthermore, permitted any setting of the valve without disconnecting the equipment. The resin pot was heated with a glass fiber electrical heater constructed to fit snugly around the resin pot. Such heaters, with regulators, are readily available.

The phenol, formaldehyde, acid catalyst, and solvent were combined in the resin pot above described. This particular phenol was in the form of a flaked solid. Heat was applied with gentle stirring and the temperature was raised to 80–85° C., at which point a mild exothermic reaction took place. This reaction raised the temperature to approximately 105–110° C. The reaction mixture was then permitted to reflux at 100–105° C. for between one and one and one-half hours. The reflux trap arrangement was then changed from the reflux position to the normal water entrapment position. The water of solution and the water of reaction were permitted to distill out and collect in the trap. As the water distilled out, the temperature gradually increased to approximately 150° C. which required between 1.5 to 2 hours. At this point the water recovered in the trap, after making allowance for a small amount of water held up in the solvent, corresponded to the expected quantity.

The solvent solution so obtained was used as such in subsequent oxyalkylation steps. We have also removed the solvent by conventional means, such as evaporation, distillation or vacuum distillation, and we customarily take a small sample of the solvent solution and evaporate the solvent to note the characteristics of the solvent-free resin. The resin obtained in the operation above described was clear, light amber colored, hard, brittle, and had a melting point of 160–165° C.

Attention is directed to the fact that tertiary butylphenol, in presence of a strong mineral acid as a catalyst and using formaldehyde, sometimes yields a resin which apparently has a very slight amount of cross-linking. Such resin is similar to the one described above except that it is somewhat opaque, and its melting point is higher than the one described above and there is a tendency to cure. Such a resin is generally dispersible in xylene but not soluble to give a clear solution. Such dispersion can be oxyalkylated in the same manner as the clear resin. If desired, a minor proportion of another and inert solvent, such as diethyleneglycol diethylether, may be employed along with xylene, to give a clear solution prior to oxyalkylation. This fact of solubilization shows the present resin molecules are still quite small, as contrasted with the very large size of extensively cross-linked resin molecules. If following a given procedure with a given lot of the phenol, such a resin is obtained, the amount of catalyst employed is advantageously reduced slightly or the time of reflux reduced slightly, or both, or an acid such as oxalic acid is used instead of hydrochloric acid. Purely as a matter of convenience due to better solubility in xylene, we prefer to use a clear resin but if desired either type may be employed.

*Example 2a*

The same procedure was followed as in Example 1a preceding, and the materials used the same, except that the para-tertiary butylphenol was replaced by an equal amount of para-secondary butylphenol. The phenol was a solid of a somewhat mushy appearance, resembling moist cornmeal rather than dry flakes. The appearance of the resin was substantially identical with that described in Example 1a, preceding. The solvent-free resin was reddish-amber in color, somewhat opaque but completely xylene-soluble. It was semi-soft or pliable in consistency. See what is said in Example 1a, preceding, in regard to the opaque appearance of the resin. What is said there applies with equal force and effect in the instant example.

*Example 3a*

| | Grams |
|---|---|
| Para-tertiary amylphenol (1.0 mole) | 164 |
| Formaldehyde 37% (1.0 mole) | 81 |
| HCl | 1.5 |
| Monoalkyl ($C_{10}$–$C_{20}$, principally $C_{12}$–$C_{14}$) benzene monosulfonic acid sodium salt | 0.8 |
| Xylene | 100 |

The procedure followed was the same as that used in Example 1a, preceding. The phenol employed was a flaked solid. The solvent-free resin was dark red in color, hard, brittle, with a melting point of 128–140° C. It was xylene-soluble.

*Example 4a*

The phenol employed (164 grams) was a commercially available mixed amylphenol containing approximately 95 parts of para-tertiary amylphenol, and 5 parts of ortho-tertiary amylphenol. It was in the form of a fused solid. The procedure employed was the same as that used in Example 1a, preceding. The appearance of the resin was substantially the same as that of the product of Example 3a.

Sometimes resins produced from para-tertiary amylphenol and formaldehyde in the presence of an acid catalyst show a slight insolubility in xylene; that is, while completely soluble in hot xylene to give a clear solution they give a turbid solution in cold xylene. Such turbidity or lack of solubility disappears on heating, or on the addition of diethylethyleneglycol.

We have never noticed this characteristic property when using the commercial phenol of Example 5a which, as stated, is a mixture containing 95% para-tertiary amylphenol and 5% ortho-tertiary amylphenol. In fact, the addition of 5% to 8% of an ortho-substituted phenol, such as ortho-tertiary amylphenol to any difunctional phenol, such as the conventional para-substituted phenols herein mentioned, usually gives an increase in solubility when the resulting resin is high melting, which is often the case when formaldehyde and an acid catalyst are employed.

*Example 5a*

The same procedure was employed as in Example 1a, preceding, using 198 grams of commercial styrylphenol and 150 grams of xylene. Styrylphenol is a white solid. The resin was reddish black in color, hard and brittle, with a melting point of about 80° to 85° C.

*Example 6a*

| | Grams |
|---|---|
| Para-tertiary amylphenol (1.0 mole) | 164 |
| Formaldehyde 37% (0.8 mole) | 64.8 |
| Glyoxal 30% (0.1 mole) | 20.0 |
| Concentrated HCl | 2 |
| Monoalkyl ($C_{10}$–$C_{20}$, principally $C_{12}$–$C_{14}$) benzene monosulfonic acid sodium salt | .75 |
| Xylene | 150 |

This resin was prepared using the same equipment, and the same procedure as in Example 1a, preceding. The resin contained a slight amount of insoluble material which was removed by filtration of the xylene solution. This slight amount of insoluble material may have been the result of some very minor decomposition, due to the fact that the glyoxal was an aged sample. After removal of the small amount of insoluble material, the xylene was removed by distillation. The resultant resin was reddish amber in color, soft or liquid in consistency and xylene-soluble.

*Example 7a*

| | Grams |
|---|---|
| Para-tertiary butylphenol (1.0 mole) | 150 |
| Acetaldehyde | 44 |
| Concentrated $H_2SO_4$ | 2 |
| Xylene | 100 |

The phenol, acid catalyst, and 50 grams of the xylene were combined in the resin pot previously described under Example 1a. The initial mixture did not include the aldehyde. The mixture was heated with stirring to approximately 150° C. and permitted to reflux.

The remainder of the xylene, 50 grams, was then mixed with the acetaldehyde; and this mixture was added slowly to the materials in the resin pot, with constant stirring, by means of the separatory funnel arrangement previously mentioned in the description of the resin pot in Example 1a. Approximately 30 minutes were required to add this amount of diluted aldehyde. A mild exothermic reaction was noted at the first addition of the aldehyde. The temperature slowly dropped, as water of reaction formed, to about 100° to 110° C., with the reflux temperature being determined by the boiling point of water. After all the aldehyde had been added, the reactants were permitted to reflux for between an hour to an hour and a half before removing the water by means of the trap arrangement. After the water was removed the remainder of the procedure was essentially the same as in Example 1a. When a sample of the resin was freed from the solvent, it was dark red, semi-hard or pliable in consistency, and xylene-soluble.

*Example 8a*

| | Grams |
|---|---|
| Para-tertiary amylphenol | 164 |
| Furfural | 96 |
| Potassium carbonate | 8 |

The furfural was shaken with dry sodium carbonate prior to use, to eliminate any acids, etc. The procedure employed was substantially that described in detail in Technical Bulletin No. 109 of the Quaker Oats Company, Chicago, Illinois. The above reactants were heated under the reflux condenser for two hours in the same resin pot arrangement described in Example 1a. The separatory funnel device was not employed. No xylene or other solvent was added. The amount of material vaporized and condensed was comparatively small except for the water of reaction. At the end of this heating or reflux period, the trap was set to remove the water. The maximum temperature during and after removal of water was approximately 202° C. The material in the trap represented 16 cc. water and 1.5 cc. furfural. The resin was a bright black, hard resin, xylene-soluble, and had a melting point of 130° to 135° C., with some tendency towards being slowly curable. We have also successfully followed this same procedure using 3.2 grams of potassium carbonate instead of 8.0 grams.

*Example 9a*

| | Grams |
|---|---|
| Para-tertiary amylphenol | 492 |
| Formaldehyde, 37% | 528 |
| NaOH in 30 cc. $H_2O$ | 6.8 |
| Monoalkyl ($C_{10}$–$C_{20}$, principally $C_{12}$–$C_{14}$) benzene monosulfonic acid sodium salt | 2.0 |
| Xylene | 200 |

The above reactants were combined in a resin pot similar to that previously described, equipped with stirrer and reflux condenser. The reactants were heated with stirring under reflux for 2 hours at 100° to 110° C. The resinous mixture was then permitted to cool sufficiently to permit the addition of 15 ml. of glacial acetic acid in 150 cc. $H_2O$. On standing, a separation was effected, and the aqueous lower layer drawn off. The upper resinous solution was then washed with 300 ml. of water to remove any excess HCHO, sodium acetate, or acetic acid. The xylene was then removed from the resinous solution by distilling under vacuum to 150° C. The resulting resin was clear, light amber in color, and semi-fluid or tacky in consistency.

*Example 10a*

Resin of Example 9a was subjected to a vacuum distillation to 225° C., at 25 mm. Hg. The resulting product was a hard, brittle resin, xylene-soluble, and having a melting point of 145–150° C.

*Example 11a*

| | Grams |
|---|---|
| Commercial para-tertiary amylphenol (described in Example 4a) | 328 |
| Formaldehyde | 352 |
| NaOH in 20 cc. $H_2O$ | 4.5 |
| Monoalkyl ($C_{10}$–$C_{20}$, principally $C_{12}$–$C_{14}$) benzene monosulfonic acid sodium salt | 1.5 |

The above reactants were refluxed with stirring for 2 hours. 200 grams of xylene were then added and the whole cooled to 90–100° C., and the NaOH neutralized with 10 cc. glacial acetic acid in 100 cc. $H_2O$. The mass was allowed to stand, effecting a separation. The lower aqueous layer was withdrawn and the upper resinous solution was washed with water. After drawing off the wash water, the xylene solution was subjected to vacuum distillation, heating to 150° C. The resulting solvent-free resin was xylene-soluble, soft or tacky in consistency, and pale yellow or light amber in color.

On heating further, without vacuum distillation, the following physical changes were noted:

Heated to 160° C.—soft, tacky, pale yellow
Heated to 190° C.—hard, fairly brittle, pale yellow—low melting point
Heated to 200° C.—hard, fairly brittle, pale yellow—105–115° C. melting point
Heated to 225 C.—hard, brittle, amber—120–125° C. melting point
Heated to 250° C.—hard, brittle, dark amber—128–135° C. melting point
Heated to 275° C.—very brittle, deep brown—155–160° C. melting point The above distillation was without the use of vacuum. It illustrates that heating alone, or heating with vacuum, changes a low-stage resin into a medium or high-stage resin.

In the immediately preceding examples describing the production of resins by the vacuum distillation of resins of earlier examples, the vacuum used was approximately 25 mm. and the temperature was brought up to 225° C. Generally speaking, this is about the maximum temperature which is usable, and if the products obtained on distilling to this temperature, even if xylene-soluble, give insoluble or rubbery products on oxyethylation, the temperature used should be lower. We have found that using a temperature of 190° C. at 25 mm. gives very satisfactory compounds which have little tendency to form rubbery derivatives during oxyethylation.

*Example 12a*

| | Grams |
|---|---|
| Commercial para-tertiary amylphenol (described in Example 4a) | 164 |
| Formaldehyde | 81 |
| Monoalkyl ($C_{10}$–$C_{20}$, principally $C_{12}$–$C_{14}$) benzene monosulfonic acid sodium salt | .8 |
| Xylene | 200 |

No catalyst was added in this example. The reactants were placed in an autoclave and stirred while heating to a temperature of approximately 160° C. The total period of reaction was 5½ hrs. During the early part of this period the temperature was 156° C. with a gauge pressure of 110 pounds. During the last part of the period, probably due to the absorption of formaldehyde, the pressure dropped to 75 pounds gauge pressure while the temperature held at about 150° C. After this 5½ hour reaction period the autoclave was allowed to cool. The liquids were withdrawn and the xylene solution of the resin was decanted away from the small aqueous layer. The xylene solution, containing a bit of the aqueous layer carried over mechanically, was subjected to vacuum distillation up to 150° C. at 25 mm. Hg.

The resulting resin was fairly hard and brittle, xylene-soluble, dark, amber in color, with a melting point of 55° to 66° C., and a molecular weight of 490. If desired, one may use considerably higher pressure so as to speed up the reaction and also in order to obtain resins of higher molecular weight. We have employed the same procedure with moderately higher temperatures and definitely higher pressures.

Example 13a

|  | Grams |
|---|---|
| Menthylphenol (V. I.) (3.0 moles) | 696 |
| Heptaldehyde (3.0 moles) | 343 |
| Concentrated $H_2SO_4$ | 6 |
| Xylene | 500 |

The procedure employed was essentially the same as in Example 7a where acetaldehyde was employed, but with the difference that due to the fact that heptaldehyde is a higher boiling aldehyde, it was not necessary to dilute it with the xylene. For this reason all the xylene was added to the initial mixture, and the heptaldehyde was added by means of the separatory funnel arrangement. Thus, the phenol, acid catalyst, and solvent were combined in a resin pot by the same procedure used in Example 7a. The resin, after removal of the solvent by distillation, was clear, dark red in color, had a soft, tacky appearance and was xylene-soluble.

Example 14a

|  | Grams |
|---|---|
| Nonylphenol (31 moles) | 6,820 |
| Formaldehyde 37% (42 moles) | 3,430 |
| NaOH (in 200 c. c. $H_2O$) | 93 |
| Xylene | 2,040 |

The above reactants were combined in a 5-gallon autoclave and heated with stirring in the following manner:

| Time | Temperature | Pounds per Square Inch |
|---|---|---|
|  | °C. |  |
| 10:30 a. m. | 25 | 0 |
| 11:00 a. m. | 100 | 15 |
| 11:30 a. m. | 127 | 40 |
| 12:00 noon | 148 | 60 |
| 1:00 p. m. | 177 | 130 |
| 1:30 p. m. | 185 | 160 |
| 2:00 p. m. | 194 | 185 |

The reaction was stopped at this point, sufficient cooling water was applied to lower the temperature to approximately 80° C., or cool enough to permit opening the autoclave and adding 202 grams of glacial acetic acid to neutralize the NaOH.

The product was then removed from the autoclave and the resin solution diluted further so as to effect a ready separation of the aqueous layer. After twice washing with water to remove the excess formaldehyde, acetic acid and formed salt, the resin was subjected to vacuum distillation to 149° C. at 25 mm. Hg vacuum. The resulting resin was reddish black in color, xylene-soluble, hard but not brittle, and had a melting point of 85° to 90° C.

Example 15a

|  | Grams |
|---|---|
| Amyl salicylate (2.0 moles) | 416 |
| Formaldehyde 37% (2.3 moles) | 182 |
| Concentrated HCl | 20 |
| Monoalkyl ($C_{10}$–$C_{20}$, principally $C_{12}$–$C_{14}$) benzene monosulfonic acid sodium salt | 2.5 |
| Xylene | 200 |

The same procedure was followed as in Example 1a. The resin was soft and amber in color.

Example 16a

|  | Grams |
|---|---|
| Para-hydroxy ethylbenzoate | 156 |
| Formalin (formaldehyde 37%) | 88 |
| Oxalic acid (dissolved in 1 part water) | 1.6 |

The reaction time and conditions were the same as in Example 1a, except no alkylaryl sulfonate was added. The reacted components were dehydrated by heating at atmospheric pressure between 100° and 150° C. until a hard non-tacky resin was obtained.

On heating further to a temperature of 250° C., without vacuum and removing a small amount of additional water, there was obtained an almost transparent, very light amber colored resin, which was not only hard but also brittle.

Example 17a

|  | Grams |
|---|---|
| Salicylic acid | 150 |
| Hexamethylenetetramine | 34 |
| Alcohol (ethyl | 400 |

The above mixture was refluxed for 20 hours. At the end of this time the mixture was heated to 150° C. with a distillation of all the alcohol. The resultant product was a dark red hydroscopic resin. This resin was then dissolved in 600 grams of anhydrous methyl alcohol, and 2 grams of para-toluene sulfonic acid added as a catalyst. This mixture was then refluxed for 20 hours. At the end of this time the alcohol was removed along with water of esterification. The resin was dissolved again in another 600-gram lot of methyl alcohol and again refluxed for 20 hours. At the end of this time the alcohol and water were distilled off again and the resin dissolved for a third time in 600 grams of anhydrous methyl alcohol and again refluxed for 20 hours. At the end of this period of time the methanol and water formed were distilled off, yielding the methyl ester in presence of a small amount of sulfonic acid present as a catalyst.

The resin was dark red in color and very soft. It was not soluble in xylene but 100 grams of resin made a very satisfactory solution with 50 parts of xylene and 50 parts of diethylene glycol diethylether.

The value of salicylic acid as a resin-making compound for the production of compounds for use in the present invention rests not so much in the use of the product as such, as in its use in admixture with other phenolic reactants. Thus, if one makes a mixture of approximately 4 moles of para-amylphenol, for example, and one mole of salicylic acid and resinifies the mixture, there are two advantages: (1) the mixture is soluble, or at least it can be handled in xylene much more advantageously than resins from salicylic acid alone, and (2) one obtains a resin which has certain possibilities for further reaction which are not present in the usual hydrocarbon substituted phenol in its simplest aspect in the following manner:

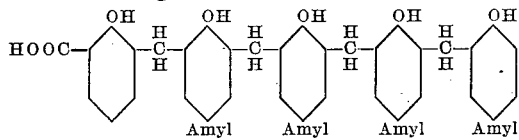

The above formula is, of course, an idealized structure for obvious reasons because the salicylic acid nucleus presumably can appear at any point in the resin molecule. Such resin, or for that matter a resin having an increased number of salicylic acid radicals, can be oxyalkylated in the same manner as other phenol-aldehyde resins.

The reactive carboxyl radical permits a number of variations. Thus, the resin can be reacted with reagents such as ethylene glycol, glycerol, triethanolamine, diethanolamine, etc.

*Example 18a*

| | Grams |
|---|---|
| Salicylic acid (0.5 mole) | 69 |
| Para-tertiaryamylphenol (2.0 moles) | 328 |
| Monoalkyl ($C_{10}$–$C_{20}$, principally $C_{12}$–$C_{14}$) benzene monosulfonic acid sodium salt | 1.5 |
| Concentrated HCl | 20 |
| Xylene | 400 |
| Formaldehyde | 208 |

The same procedure was followed as in Example 1a, except that the amount of hydrochloric acid employed is comparatively high, to wit, 20 grams, and the reflux time, instead of being 1½ hours is 3 hours. Only a very small amount of salicylic acid was lost on evaporation. The resin is soft and tacky, and xylene-soluble.

*Example 19a*

The same procedure was followed as in the preceding example, through the point where all the water had been removed, leaving the anhydrous resin in the solution of xylene. The temperature at this point was about 145° C. Eighty-five grams of triethanolamine, commercial grade (about $\frac{6}{10}$ mole) were then added. More xylene was then allowed to distill out until the temperature rose to 180° to 185° C. The mass was then allowed to reflux at this temperature for approximately three hours with the usual trap arrangement. During this period substantially all the water of esterification was eliminated, the amount of water being approximately 10 cubic centimeters.

When all the water had been eliminated the xylene which distilled out earlier between the range of 145° to 185° C., was again added to the mixture so as to give a uniform solution containing about 60 parts of resin and 40 parts of xylene.

The cheapest salicylate is methylsalicylate. A resin can be prepared from methylsalicylate alone or methylsalicylate in combination with para-amylphenol, para-butylphenol, or any one of a number of other phenols as described, and then the resin can be subjected to alcoholysis in presence of an alkali so as to replace the methyl radical by some higher butyl radical. This illustrated by alcoholysis with hexyl alcohol, octyl alcohol, decyl alcohol, benzyl alcohol, cyclohexyl alcohol, oleyl alcohol, styryl alcohol, ethyleneglycol, diethylene glycol, phenoxyethanol, etc. The salicylic acid ester of the corresponding alcohol is also useful as an initial raw material, instead of methyl salicylate.

The carboxyl radical of salicylic acid remaining in a salicylic acid resin, such as those illustrated above may be reacted, not only with other conventional reactants such as ammonia, primary amines, such as amylamine, secondary amines such as diamylamine, ethyl ethanolamine, diethanolamine, butyl ethanolamine, and propanolamines, hexanolamines, butanolamines, pentanolamines, and cyclohexylamines and a variety of other suitable compounds in which the final effect is simply that of an acylation reaction.

Other phenols of the kind previously mentioned include dimethylaminomethylphenol. This is a mixture of

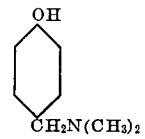

and

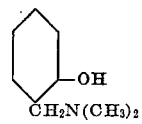

As in the case of salicylic acid the most desirable products are those in which dimethylaminomethylphenol contributes a portion of the phenolic reactants. This is illustrated by the following example:

*Example 20a*

| | Grams |
|---|---|
| Dimethylaminomethylphenol (¼ mole) | 27.5 |
| Para-tertiaryamylphenol (1.0 mole) | 164 |
| Formaldehyde 37% (1¼ moles) | 102 |
| Concentrated HCl (¼ mole) | 26.5 |
| Xylene | 200 |

The same procedure was followed as in Example 1a, except that no monoalkyl benzene monosulfonic acid sodium salt was added; and the amount of hydrochloric acid employed was sufficient to neutralize the basic amine radical and leave a slight excess. The acid was added to the basic phenol first and after the neutralization was complete, with the slight acidity as indicated, the aldehyde was then added and heat was applied. The solvent-free product was amber in color, slightly opaque and soft to pliable in consistency. Such resin, when treated with strong caustic, is of course, converted into a resin having a free basic radical.

The foregoing examples have illustrated the production of suitable resins from difunctional phenols and aldehydes. For the preparation of such resins, suitable phenols include: o- and p-cresols; para- and ortho-ethyl-phenol; 3-methyl - 4 - ethyl-phenol; 3 - methyl-4-propyl-phenol; 2-ethyl-3-methyl-phenol; 2-propyl-3-methyl-phenol; para- and ortho-propyl-phenol; para - tertiary - butyl-phenol; para-secondary-butyl-phenol; para-tertiary-amyl-phenol; para-secondary - amyl - phenol; para-tertiary-hexyl-phenol; para - isooctyl - phenol; ortho-phenyl-phenol; para-phenyl-phenol; thymol; ortho-benzyl-phenol; para-benzyl-phenol; para-cyclohexyl - phenol; para - tertiary-decyl-phenol; para - dodecyl-phenol; para-tetradecyl-phenol; para - octadecyl - phenol; para - nonyl-phenol; para - menthyl-phenol; para-eicosanyl-phenol; para - docosanyl - phenol; para - tetracosanyl - phenol; para-beta-napthyl-phenol; para-alpha-naphthyl-phenol; para-pentadecyl-phenol; that of the formula

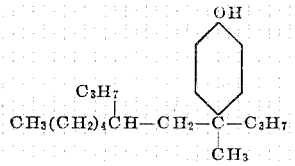

para-tertiary-alkyl-phenols of the formula

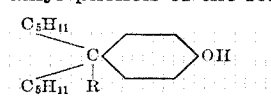

in which R is $C_9H_{19}$ to $C_{13}H_{27}$; para- and ortho-cetyl-phenols; para-cumyl-phenol; phenols of the formula

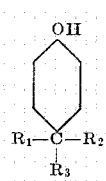

in which $R_1$ represents a straight chain hydrocarbon radical containing at least 7 carbon atoms and $R_2$ and $R_3$ represent hydrocarbon radicals the total number of carbon atoms attached to the tertiary carbon being at least 11; and phenols of the formula

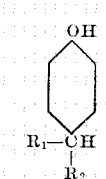

in which $R_1$ represents an alkyl hydrocarbon radical containing at least 7 carbon atoms in a straight chain and $R_2$ represents an alkyl hydrocarbon radical containing at least 2 carbon atoms, the total number of carbon atoms in $R_1$ and $R_2$ being at least 11; and the corresponding ortho-para substituted meta-cresols and 3,5-xylenols; the akyl salicylates, including methyl salicylate, butyl salicylate, amyl salicylate, octyl salicylate, nonyl salicylate, dodecyl salicylate; benzyl salicylate, cyclohexyl salicylate, oleyl salicylate styryl salicylate, phenoxy ethyl salicylate; p-hydroxy-ethyl-benzoate; salicylic acid; p-chlorophenol; o-chlorophenol; o- and p-dimethylaminomethyl-phenol; p-pentenyl-phenol; guaiacol; catechol; p-phenoxyphenol; p-hydroxybenzophenone; hydroxyphenylheptadecyl ketone; hydroxy-phenyl-heptadecenyl ketone; hydroxyphenylundecyl ketone; beta naphthol; methyl naphthol; and carvacrol.

For the production of aldehyde-linked resins, including not only those derived from difunctional phenols, but also those derived from trifunctional and tetrafunctional phenols (e. g., bis-phenols) and modified phenolic resins involving aldehyde-derived bridges, any aldehyde capable of forming a methylol or a substituted methylol group and having not more than 8 carbon atoms is satisfactory, so long as it does not possess some other functional group or structure which will conflict with the resinification reaction or with the subsequent oxyalkylation of the resin, but the use of formaldehyde, in its cheapest form of an aqueous solution, for the production of the resins is particularly advantageous. Solid polymers of formaldehyde are more expensive and higher aldehydes are both less reactive, and are more expensive. Furthermore, the higher aldehydes may undergo other reactions which are not desirable, thus introducing difficulties into the resinification step. Thus acetaldehyde, for example, may undergo an aldol condensation, and it and most of the higher aldehydes enter into self-resinification when treated with strong acids or alkalis. On the other hand, higher aldehydes frequently beneficially affect the solubility and fusibility of a resin. This is illustrated, for example, by the different characteristics of the resin prepared from paratertiary amyl phenol and formaldehyde on one hand and a comparable product prepared from the same phenolic reactant and heptaldehyde on the other hand. The former, as shown in certain of the preceding examples, is a hard, brittle solid, whereas the latter is soft and tacky, and obviously easier to handle in the subsequent oxyalkylation procedure.

Cyclic aldehydes may be employed, particularly benzaldehyde. The employment of furfural requires careful control for the reason that in addition to its aldehydic function, furfural can form vinyl condensations by virtue of its unsaturated structure. The production of resins from furfural for use in preparing products for the present process is most conveniently conducted with weak alkaline catalysts and often with alkali metal carbonates. Useful aldehydes, in addition to formaldehyde, are acetaldehyde, propionic aldehyde, butyraldehyde, 2-ethylhexanal, ethylbutyraldehyde, heptaldehyde, and benzaldehyde, furfural and glyoxal. It would appear that the use of glyoxal should be avoided due to the fact that it is tetrafunctional. However, our experience has been that, in resin manufacture and particularly as described herein, apparently only one of the aldehydic functions enters into the resinification reaction. The inability of the other aldehydic function to enter into the reaction is presumably due to steric hindrance. Needless to say, one can use a mixture of two or more aldehydes although usually this has no advantage.

The following discussion and examples illustrate suitable modified phenolic resins, a large number of which are known, including resins derived in part from materials which themselves form polymers or are resinous. In some instances the structure becomes complex by the fact that some type of linkage other than bridging enters into the combination. Thus, there are a variety of known polyethenic resins such as vinyl resins, acrylic resins, coumarone-indene resins, etc. Without attempting more than just the briefest description for the herein described purpose, the resin forming part of three such ethylenic molecules may be depicted in the following manner:

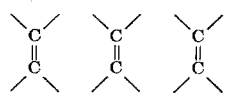

The addition trimer obtained therefrom may be depicted in the following manner:

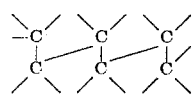

This sort of structure can be combined with a phenol to yield a phenol-modified resin. This structure may be shown in the following manner:

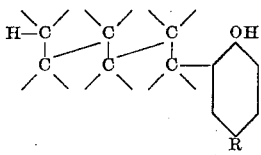

This type of resin is prepared by employment of a polymerizable monomer such as coumarone, indene, various terpenes, vinyl compounds, such as vinylacetate, styrene, etc. Such resins may be depicted as a mixed type resin, partly phenolic, for the reason that a substantial or even the larger part of the resin molecule is the addition polymer of some other type of resin as noted and perhaps only the terminal position is occupied by a phenolic nucleus.

Vinylphenol polymers are satisfactory, if solvent soluble. Thus, we have examined a series of four polyvinylphenols in which the molecular weights were as follows: 280, 410, 545 and 1280. The latter was insoluble in any suitable solvent but the one having a molecular weight of 545, was soluble in diethyleneglycol diethylether, and, after being oxyethylated in such solution, gave a good product. The one of the lowest molecular weight was a thick, viscous, amber fluid, and the other three were solids.

Our efforts to obtain a vinylbutylphenol, vinylamylphenol, and the like, by using the corresponding para-substituted tertiary phenol and introducing a vinyl group in the ortho position have been unsatisfactory, but based on fragmentary experience our best conjecture in the matter is that such compounds, if obtainable in a practical way and at a reasonable cost, would give highly effective demulsifiers.

The more important modified phenol resins are those in which a phenol-aldehyde resin has been prepared and then such resin modified by combination with a structure having reactive unsaturation or the equivalent. Possibly the commonest reactant employed for modification is resin.

Referring again to a simple representation of a phenolaldehyde resin, as for example one obtained from amylphenol and formaldehyde, one may employ the following representation:

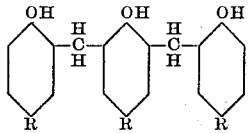

Proper manipulation yields a modification which in its simplest aspects is illustrated in the following manner:

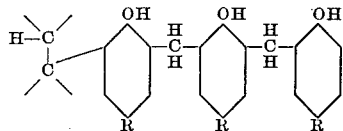

Needless to say, reaction can take place at both terminal nuclei. Thus, one finds gradation going all the same way from modified phenolaldehyde resins to phenol-modified resins of addition polymers. These resins meet the requirements of what has been said herein as to the suitable resins which can be oxyalkylated to produce satisfactory and effective demulsifying agents.

We have prepared a variety of rosin-modified phenol-aldehyde resins with and without the use of glycerin and with or without the use of maleic anhydride, and have purchased in the open market resins of this type, manufactured from amylphenol, butylphenol, or paraphenyl-phenol, and oxyalkylated them and obtained effective demulsifying agents. For example, one company (Cook Paint and Varnish Company, Kansas City, Missouri) sells two types of resins which are marketed under the identifications of Nos. R3339 and R-3334. Both are prepared from rosin and paraphenylphenol. The first mentioned does not have any added glycerin and the second one does. The first mentioned has an acid number of approximately 60, and the second has an acid number of about 65. These are examples of suitable rosin-modified resins.

Other modified resins which yield effective demulsifiers on oxyalkylation include those in which styrene is employed. These are well known. Similarly, alpha-terpineol - modified phenol-aldehyde resins are entirely satisfactory as a raw material for the oxyalkylation process, yielding, after oxyalkylation, effective demulsifiers. It is our preference to employ resins obtained from difunctional phenols, such as para-tertiary-amylphenol in combination with alpha-terpineol (pine oil), either alone or in combination with rosin.

Still another modification involves the use of benzyl chloride as a modifying agent. We have treated resins obtained from difunctional phenols, such as amylphenol, etc., and formaldehyde, with benzyl chloride, so as to evolve hydrochloric acid and thus modify the resin and obtained useful products on oxyalkylation. Another modification involves the use of naphthalene, or other condensed ring structure.

We have also prepared useful products from resins in which a monofunctional phenol is employed to modify the character of the resin, e. g., by the use of diamylphenol in the known way. The modified resin when subjected to the oxyalkylation procedure, gave a useful product.

*Example 21a*

100 parts of U. S. P. phenol were mixed with 5 parts of 66° Baumé sulfuric acid and the mixture heated to 150° C. To this mixture was added about 155 parts of alpha-terpineol, i. e., approximately equimolecular proportions of the phenol and the oxyterpene were used, although considerable deviation from such proportions may be had without affecting the quality of the final resin. The addition of the terpineol should be made while the temperature of the mixture is somewhat below the boiling point of the oxyterpene, and at a temperature sufficiently high to induce chemical reaction between the phenol and the terpineol with subsequent resin formation. After the addition of the oxyterpene had been completed, the mixture was subjected to distillation in vacuo, until a brittle resin was produced which was purified by the usual washing and purifying operations.

*Example 22a*

Hydrogen chloride was passed at about 40° C. into domestic pine oil, until an increase in weight of 55% had been reached. One hundred parts of the product freed from the aqueous portion formed during the conversion was condensed at 60° to 80° C., with an equal quantity, by weight, of phenol in the presence of zinc chloride (1 part). A reaction could be observed even before the addition of the catalyst, which, after the addition, proceeded very vigorously and was completed in a few hours. After removing the unreacted phenol terpene compound, 110 parts of a light colored condensation product of hard, resinous nature were obtained.

Instead of employing all the conversion product from the pine oil and the hydrogen chloride for the condensation, it can be cooled down to about 10° C., where it sets a crystalline mass, about half of which is isolated in the form of pure white crystals by suctional filtration. These mainly consisted of dipentene di-hydrochloride, and, if reacted with phenol, as hereinbefore described, give an almost colorless, very hard, resinous, high molecular phenol. The hydrohalides obtained from the various terpenes, particularly the hydrochlorides, may represent mono-derivatives or di-derivatives, or derivatives having three or more moles of hydrohalide introduced per mole of terpene. Similar useful reactants can be obtained by the use of chlorine, particularly diluted chlorine, so as to yield products which may be utilized in the same manner as those derived from the hydrohalides.

A large number of products of reaction of dipentene and a phenol with formaldehyde or other aldehydes, including acetaldehyde, paraaldehyde, various anhydride polymers with aldehyde, etc., are known, and on oxyalkylation give useful products.

Example 23a

About 256 parts of naphthalene were added to a mixture of about 150 parts of Formalin and about 120 parts of 66° Baumé sulfuric acid. The mixture of Formalin and acid was cooled prior to the addition of the naphthalene. Heat was applied to the resulting mixture, with stirring, and when a temperature of about 103° C. was reached, it was maintained between 103° and 115° C. for about 35 hours, after which 54 parts of orthocresol were introduced. The heating and stirring were continued for an additional period of about 5.5 hours, after which the resin product was separated from the heated mass by adding about 200 parts of toluene and a solution of 75 parts of sodium hydroxide in about 150 parts of water. An aqueous layer formed and was removed and the toluene solution of the resin was filtered through diatomaceous earth to clarify and promote additional separation or breaking of an emulsion. The resin solution was then steam-distilled to remove the toluene. This resin was soluble in acetone and trichloroethylene, butyl acetate, and was slightly soluble in petroleum hydrocarbons, alcohol, butyl alcohol, and turpentine.

Example 24a

Run 2 parts of borofluoroacetic acid slowly, in the course of 2 to 3 hours, with vigorous stirring, into 100 parts of crude solvent naphtha boiling between 155°–192° C., and containing 58% of coumarone and indene and 4% of phenolic substances (phenols and cresols), and initially heated to 35° C., while the temperature of the reaction liquid rises to 60° C. The temperature is prevented, by suitable cooling, from rising considerably above this level, and the stirring is continued for 6 to 7 hours, and heating is then effected to 80°–90° C., for half an hour, with the addition of 25 parts of xylene or pure solvent naphtha, and 6 to 8 parts of barium oxide. The volatile constituents of the filtered, nearly colorless reaction liquid are distilled off in vacuo. There remains an almost colorless resin, which sinters at 140° C. and melts at 165° C. and is soluble in turpentine, tetrahydronaphthalene and aromatic hydrocarbons.

Example 25a

Introduce 20 gallons of No. 2 crude solvent naphtha, containing 60% of reactives, together with 5 gallons of cresol into a vessel having closed circulating coils for both heating and cooling fluids. Activated clay of high particle porosity is then added in a quantity equal to 6% of the weight of the blend of naphtha and cresol, and the temperature of the blend is raised to between 90° C. and 100° C. with agitation. The mixture is agitated at about 100° C. for about 4 hours. The reacted mixture is then filtered to remove the activated clay, and is then subjected to an initial distillation, during which there is distilled off refined naphtha and any unreacted cresol. The residual product of the distillation is a soft, somewhat tacky, resin. By steam distillation this soft resin is separated into a hard resin and a fluid resin, or heavy resinous oil.

The hard resin thus obtained has a melting range of 85° C. to 95° C. It is light in color and soluble in isopropanol, ethanol, and other solvent alcohols, as well as in the common hydrocarbon solvents.

Commercially available phenol-modified coumarone-indene resins, such as those sold under the trade names "Pale Hard Nevillac" resin, "Nevillac 1°" resin, and "Nevillac RA" are suitable resins.

The following discussion and examples illustrate suitable phenolic resins prepared from aldehydes and trifunctional phenols, including such phenols as cardanol and hydrogenated cardanol and including resins of the types known as Novolaks and resoles and related resins.

Example 26a

| | Grams |
|---|---|
| Cardanol | 403.2 |
| Formaldehyde (37%) | 113.4 |
| Xylene | 403.2 |
| Concentrated HCl | 3.3 |
| Monoalkyl ($C_{10}$–$C_{20}$, principally $C_{12}$–$C_{14}$) benzene monosulfonic acid sodium salt | 1.4 |

The resin was prepared in the same manner as described in Example 1a, except that the reflux period was 3½ hours instead of 1½ hours. The xylene-free resin was reddish-black, and soft to pliable.

In connection with resins derived from cardanol and cardanol mixtures, attention is directed to the fact that a somewhat similar phenol is available by reaction which involves resorcinol as the initial reactant. If resorcinol is converted into the monoalkylate and then reacted with one mole of ethylene chlorohydrin or if resorcinol is treated mole for mole with ethylene oxide, the resultant compound may be indicated thus:

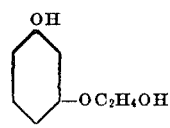

This is simply phenol (hydroxy benzene) with an oxyethanol radical in the meta position. We have esterified such compound with a variety of monocarboxy acids varying from lower fatty acids to the higher fatty acids and obtained phenols of the following composition:

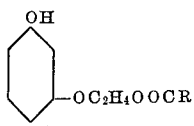

Such phenols have then been resinified in the same manner employed in connection with cardanol and hydrogenated cardanol as illustrated in the immediately preceding examples, and have been found to give suitable resins.

*Example 27a*

108 parts of crude cresol were heated with 80 parts of 30% formaldehyde, 200 parts of water and 1 part of 37% hydrochloric acid for 3 hours while refluxing. The resin thus obtained was washed with water until neutral and freed from water by heating it to 130° C. to 140° C. under a reduced pressure.

*Example 28a*

A Novolak type resin was made by reacting 5,000 parts of phenol containing 10 per cent orthocresol with 2,750 parts of 37 per cent aqueous formaldehyde and with 50 parts of 85 per cent phosphoric acid as a catalyst. The mixture of these ingredients was refluxed at atmospheric pressure with continuous mechanical agitation for about 6 hours, when upon testing it was found that practically all the formaldehyde had reacted and the pH value of the mass as determined by the separate aqueous layer was 1.6; the resin was then dehydrated by heating to a temperature of 160° C. under atmospheric pressure, resulting in a resin having a melting point of 74° C.

*Example 29a*

There are available in the open market various comparatively low-melting resins obtained from difunctional phenols and formaldehyde or from acetaldehyde. The substituent group usually has 4 to 8 carbon atoms and the commonest examples are resins produced from para-tertiary-butylphenol, para - tertiaryamylphenol, para-phenylphenol, etc. For instance, one company manufactures such resins from the amylphenol, the butyphenol, and the phenylphenol. All these resins are characterized by low-melting point of less than 100° C. We have found that any of these commercially available resins can be resinified further by the addition of phenol and formaldehyde using conventional procedure. As an example of this procedure, the following will serve as an illustration:

| | Pounds |
|---|---|
| Amylphenol resin BR-4036 (this resin is manufactured by the Bakelite Company, Bloomfield, New Jersey) | 169 |
| Phenol | 9.4 |
| Formaldehyde (37%) | 24.3 |
| Monoalkyl ($C_{10}$-$C_{20}$, principally $C_{12}$-$C_{14}$) benzene monosulfonic acid sodium salt | 1.6 |
| Concentrated hydrochloric acid | 1.5 |
| Xylene | 180 |

The resin, the phenol, and xylene were placed in a resin pot equipped with the usual devices, i. e., stirrer, reflux condenser, heating device, thermometer well, inlets, outlets, etc. The mixture was heated to 140° C. and stirred until completely homogeneous at this temperature. On cooling to approximately 70° C., the solution became somewhat opaque. The formaldehyde, acid catalyst, and emulsifying agent were added at this temperature (70° C.). Heat was then applied so as to raise the temperature to approximately 100°–105° C. There was no exothermic reaction. The mass was allowed to reflux at this approximate temperature for one hour before any effort was made to remove the water by means of the conventional trap arrangement.

The finished resin, free from solvents, is a hard, brittle, xylene-soluble, dark red resin, and has a melting point of approximately 140° to 145° C., whereas the low-melting point resin employed in the manufacture has a melting point of 78°–83° C.

The following discussion and example illustrate suitable resins prepared from bis-phenols.

Bisphenols have a number of characteristics, two of which are as follows: (1) The divalent radical which unites the phenolic nuclei is derived from a ketone instead of an aldehyde; and (2) although some bisphenols are difunctional, others have a functionality of 3 or 4. The resins are sometimes manufactured from a phenol and ketone, either entirely or in part, and sometimes, from a bisphenol itself. Various bisphenols, particularly bisphenol A, are sold commercially in substantial quantities.

In the manufacture of resins from bisphenols the usual reactants consists of such phenols along with ketones of various kinds, chlorinated compounds such as dichloroethylether, or glycerol dichlorohydrin, and acetylene. Other suitable resins are obtained by reacting phenols with ketones to yield bis-phenols and then without separation reacting further with an aldehyde. A more complicated structure is sometimes prepared in which an excess of the ketone is used over and above the amount required theoretically to yield the bis-phenol. In this latter case subsequent reaction with an aldehyde is also involved. As an alternate procedure the bis-phenol may be prepared, separated and purified and subjected to reaction with an aldehyde so as to yield a ketone-phenol-aldehyde resin. In any event, if desired a bis-phenol, essentially a monomer or a phenol-ketone resin which is polymeric in the sense that the structural units enter more than once, can be treated with an aldehyde so as to yield a ketone-phenol-aldehyde resin of a conventional type. Particularly suitable resins are obtained from commercially available bis-phenols and aldehydes without the addition of more ketone.

*Example 30a*

228 parts of diphenylol propane, 58 parts of acetone and 22.8 parts of hydrochloric acid were heated under reflux with stirring for from 16 to 24 hours. The dark red resin which formed was separated from the small amount of aqueous liquid present, washed with water and distilled under vacuum until a resin melting at 50 to 60° C. was obtained.

Other bisphenols, suitable for preparing resins of the type used for the preparation of the demulsifying agents used in accordance with the invention, by procedures similar to those of the Example 30a, include di-p-hydroxyphenol-phenyl-ethyl-methane, di-p-hydroxyphenyl-methyl-amyl - methane, di - p - hydroxyphenyl - propyl-methane, di-(p-hydroxy-m-methyl-phenyl)-di-methyl-methane, di-(p-hydroxy-m-ethyl-phenyl)-dimethyl-methane, di-(p-hydroxy-m-propyl-phenyl)-dimethyl methane, di-(p-hydroxy-m- phenyl-phenyl)-dimethyl-methane, di - (p - hydroxy-m-chloro-phenyl)-dimethyl-methane, and di-p-hydroxyphenyl-cyclohexyl-methane. These are produced from the various ketones and phenols, and, in each case, will ordinarily be predominantly the named material, but in admixture with varying amounts of isomers, etc. Instead of starting with the bisphenol, equally satisfactory products are obtained by starting with the corresponding phenols and ketones, without isolation of any bisphenol.

The following discussion and examples illustrate suitable phenolic resins in which the bridging radicals, are, in part at least, of non-aldehydic origin (resins derived from bisphenols, heretofore illustrated, may also be regarded as in this category, in that in them phenolic nuclei are linked through ketone-derived radicals by reaction with nuclear phenolic hydrogen atoms, as may certain of the modified resins above illustrated) and in which the phenolic nucleus or nuclei in the resin are, in part at least, linked by replacement of one or more nuclear hydrogen atoms by non-aldehydic-derived bridging radicals, including sulfur, acetylene, dichlorodiethylether, etc.

Example 31a

| | Pounds |
|---|---|
| NaOH (48.3% soln.) | 84.6 |
| H₂O | 115.7 |
| Bis-phenol "A" | 131.4 |
| Diethylamine | 0.8 |

The above reactants were combined in a resin pot equipped with reflux condenser, stirrer, thermometer well, etc. and heated to 100° C. Then 82.5 pounds dichlorodiethylether were slowly added and the mixture refluxed for eight hours during which period the mass assumed a heavy, creamy appearance with an accompanying increase in viscosity. After the eight-hour reflux period, 15 pounds (48.3% solution) of NaOH were added. The apparatus was then set for distillation. 100 pounds of xylene were added at this stage, to aid in removal of water and also to thin out the mass to a moderate degree. After distilling out 150 pounds of water, there was a second addition of 100 pounds of xylene introduced into the mass to offset the thickening effect which took place with the elimination of the water. After distilling out all the water from the reaction product, there was another addition of solvent made consisting of 500 pounds of xylene and 200 pounds of methyl alcohol. This dilution permitted the separation of the salt which had formed during the reaction. The entire solution with precipitated salt was filtered so as to eliminate the salt mechanically. The resin was then subjected to distillation so as to remove the solvent. When the solvent-free resin was obtained, it was heated further to 235° C. for two hours. The resulting resin was amber colored, hard, brittle, and xylene-dispersible. It had a melting point of 85-87° C. For convenience in the matter of subsequent oxyethylation the resin was dissolved in a solvent which consisted of 42% diethylene glycoldiethylether and 58% of xylene. The finished solution was such that it contained 48% of resin and 52% of the above mixed solvent.

Example 32a

| | Pounds |
|---|---|
| p-Tert. amyl phenol | 164 |
| Dichlorodiethylether | 142 |
| NaOH (in 166 pounds H₂O) | 80 |
| H₂O | 200 |
| Diethylamine | 1.4 |

The procedure was the same as that of Example 31a, except that no xylene was added until the end of the reflux period, and a twelve hour reflux period was employed. At the end of the twelve hour reflux period, 200 pounds of xylene were added and then 10 pounds of caustic soda in 15 pounds of water. A separation was then allowed to take place and the aqueous layer withdrawn. The reaction mass was washed once with water and filtered to remove any salt. The solvent was then evaporated by distillation to 150° C. The reaction mass was finally heated for two hours at 235° C. The product was a soft resin, dark amber in color, and xylene-soluble. The product appeared to be largely trimeric with small amounts of dimeric matter present.

Example 33a

| | Grams |
|---|---|
| Para-tertiaryamylphenol | 3,280 |
| Sulfur chloride (mono) | 2,700 |
| Benzene | 2,600 |

The amylphenol and benzene were mixed together and placed in a reaction vessel with provision for stirring, cooling, etc. The sulfur chloride was added slowly while the temperature was kept at 35° to 40° C. The time required was two to three hours. When all the sulfur chloride had been added, the temperature was raised slowly to 50°–60° C. and held at this temperature for 15 to 20 minutes. During this period there was considerable liberation of hydrochloric acid. The mass was diluted further by the addition of another 2,000 grams of benzene which was added to reduce the viscosity of the mass and to permit further escape of hydrochloric acid as well as to permit greater ease of subsequent washing. The entire mass was washed with 3,000 grams of 10% sodium carbonate solution, in order to remove HCl, etc. After completely washing my moderate agitation, the wash water was withdrawn and there was added to the mass an amount of xylene equivalent to 25% of its weight.

Example 34a

A diphenylol methane was prepared from two moles of p-tertiary-amylphenol and one mole of formaldehyde so as to yield a product of substantially the following composition:

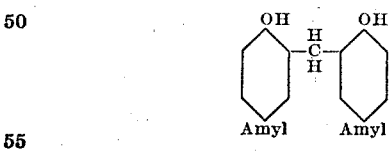

The diphenylol methane of the above composition was treated with sulfur monochloride as follows:

| | Grams |
|---|---|
| Diphenylol methane, as above | 1,700 |
| Benzene | 500 |
| Sulfur monochloride | 685 |

The diphenylol methane and benzene were mixed and then the sulfur chloride added over a two to three-hour period, holding the temperature at 35° to 40° C. After this first period the temperature was increased to 60° to 90° C. for one-half hour. The reaction mass was then cooled and washed with 1,000 grams of 10% sodium carbonate solution. The wash water was withdrawn and the mass heated to evaporate the benzene.

Example 35a

One need not manufacture alkyl phenol sulfide resins but can purchase the same in the open market. For example, they are sold in commerce under the name of "Vultac," being a trade-mark name of Sharpless Chemical Company, Inc. Such resins are suitable.

Example 36a 100 parts of 4-hydroxydiphenyl and 6 parts of zinc acetate are introduced into a shaking autoclave which is freed from air and filled with nitrogen under a pressure of 5 atmospheres. Acetylene is then introduced until the pressure is 10 atmospheres and the autoclave heated to 190 C., more acetylene being introduced as the pressure drops until 17 parts of acetylene have been absorbed. A resin softening at about 135° C. and suitably solvent-soluble is obtained.

Example 37a

The butyl-phenol-acetylene resin sold by General Aniline and Film Corporation under the name "Koresin" is a suitable phenol acetylene resin.

The following examples illustrate suitable phenolic resins in which the bridging is in part the result of nuclear hydrogen replacement and in part the result of reaction at non-nuclear reactive positions.

Example 38a

Methylene disalicylic acid was obtained by condensing two moles of salicylic acid with one mole of formaldehyde. The resultant product may be considered as the initial stage of a phenol-aldehyde resin. However, since it was also a dicarboxy acid, it could be converted into a resin by reaction with a polyhydric alcohol.

|  | Grams |
| --- | --- |
| Methylene disalicylic acid | 2,880 |
| Ethyleneglycol | 620 |
| Diethyleneglycol diethylether | 2,880 |

The three ingredients were combined in a flask equipped with a reflux condenser. The mixture was refluxed for 2 hours at a temperature of 119° C. 35 grams of toluene sulfonic acid were then added, along with 1,000 grams of xylene. The mixture was then refluxed for 4 hours longer, and then distilled with the usual trap arrangement. This eliminated all the water formed as a result of esterification, along with some of the diethyleneglycol diethylether. The excess of xylene was evaporated off and the solid that remained contained uncombined methylene disalicylic acid equivalent to about 150 grams. A sample, after evaporation of the xylene, weighed approximately 4,800 grams. Assuming the loss of one mole of water in the reaction and that all the xylene was removed, the product described contained approximately 63% resin and 37% solvent (diethyleneglycol diethylether). The sulfonic acid present as a catalyst was neutralized with an alcoholic solution of potassium hydroxide. The amount employed was sufficient to neutralize all the toluene sulfonic acid and to give a slight excess which would serve as a catalyst for subsequent oxyalkylation.

Example 39a

|  | Grams |
| --- | --- |
| Para-tertiary amylphenol | 2,790 |
| Aniline | 1,590 |
| Formaldehyde (35–37%) | 3,020 |
| Xylene | 3,000 |

The aniline, phenol, and xylene were combined in the resin pot and heated to 70° C. The formaldehyde was then slowly added with an exothermic reaction increasing the temperature to 95° C. After addition of the formaldehyde, heat was again applied to raise the temperature to 105°–110° C., the mixture being refluxed for three hours, after which 2,550 grams of water were removed by the trap arrangement. As the water distilled out, the temperature was allowed to increase to 145°–150° C. (or the reflux temperature of the xylene) and the reaction product was heated one hour at this temperature to assure completion of the reaction. The resulting resin, on evaporation of solvent, was hard, brittle, xylene-soluble and had a melting point of 125° C. Similar resins prepared using other difunctional phenols, such as butylphenol and octylphenol, gave suitable resins.

Example 40a

|  | Grams |
| --- | --- |
| Phenol | 10,000 |
| Glycerol | 7,000 |
| Concentrated sulfuric acid | 100 |

The above reactants were heated in the resin pot at 160° to 185° C. until 3,380 grams of water had been distilled off. The acidity of the compound was then neutralized with barium carbonate and calcium oxide. A decided color change was noted from a reddish brown in the acid state to a deep purple in the alkaline state. The reaction product was then diluted with 10,000 grams of dioxane in order to filter out the insoluble salts. After filtration, the dioxane was removed by distillation from the salt-free resin, leaving a soft, pliable resin.

Example 41a

|  | Grams |
| --- | --- |
| 2-ethyl-3-propyl acrolein | 1,195 |
| Para-tertiaryamylphenol | 1,640 |
| Xylene | 1,500 |
| Concentrated sulfuric acid | 30 |
| Maleic anhydride | 930 |

The amylphenol and acid catalyst were heated in the resin pot to 150° C. The acrolein and xylene in admixture were then slowly added with no pronounced reaction being noted. The temperature gradually fell to 100° to 105° C. as water was formed and started refluxing. The product was refluxed for an hour at the temperature of 105° C. The water was then removed by means of the trap arrangement. After removal of all the water, the product was cooled to 60° C. At this point, the maleic anhydride was added and the heat reapplied, slowly increasing the temperature to 260° C. This product was then saponified with alcoholic potassium hydroxide. After removal of the alcohol by distillation, the saponified product was acidified HCl and dissolved in ethylether and washed with water to remove the excess hydrochloric acid, with the ether then being removed by evaporation.

Example 42a

|  | Grams |
| --- | --- |
| Rosin | 1,300 |
| Phthalic anhydride | 600 |
| Glycerol | 500 |
| (Phenol as specified below.) | |

The above reactants were heated in the resin pot equipped with stirrer, reflux condenser, water trap, thermometer well, etc., to 260° C., removing 130 grams of water, and held at this temperature for one and one-half hours. The product was then cooled to 80° C., at which point 1,000 grams of phenol and 340 grams of para-formaldehyde were added and the heat reapplied, increasing the temperature to 230° C. The product was heated for one hour at this temperature. The mass was then cooled sufficiently to add 2,000 grams of xylene. The resulting resin, minus solvent, was semi-hard, pliable, xylene soluble and dark amber in color.

Example 43a

| | Grams |
|---|---|
| Phenol | 940 |
| Urea | 1,940 |
| Formaldehyde (37%) | 25 |
| Sulfuric acid (40%) | 25 |
| Benzene | 1,000 |

The materials were combined in a resin pot equipped with stirrer, thermometer well, reflux condenser, etc., and heated under reflux at 75° to 80° C. for 4½ hours. 170 grams of NaOH in 740 grams of water were then added. The heat was reapplied, increasing the temperature to 85° to 90° C., distilling off sufficient benzene to obtain this temperature. The product was heated under reflux for 4½ hours at the 85° to 90° C. temperature.

Example 44a

This resin was a xylene-soluble phenol-styrene-oxide resin furnished by the Monsanto Chemical Company and stated to be made according to the directions of U. S. Patent No. 2,422,637, dated June 17, 1947, to Thomas, assigned to Monsanto Chemical Company.

Example 45a

Suitable resins can be obtained from phenols in which the linkage is due in part to etherization. Bisphenols derived, for example, from phenol or an ortho-substituted phenol, such as orthotertiaryamylphenol or ortho-tertiarybutylphenol and a ketone, may be described by the following formula in which R is a hydrogen atom or an alkyl radical of the kind indicated:

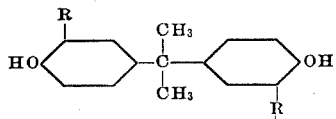

On treatment of such phenol with glycid or epichlorohydrin, with the elimination of the chlorine in the latter case, one can obtain a polyhydric alcohol of substantially the following formula:

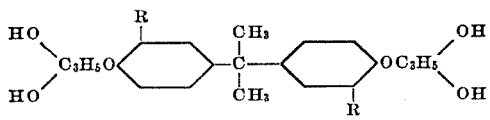

Heat polymerization, or any other suitable polymerization, of such polyhydric alcohols, if conducted so as to prevent cross-linking, produces suitable fusible resins; if such compounds are obtained by the use of epichlorohydrin then one can permit the chlorine to remain in the intermediate product and obtain a compound of the following composition:

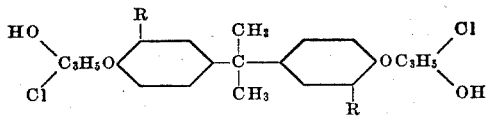

If a tetrahydric alcohol of the kind indicated by the second formula is treated with one mole of sodium or caustic soda, it is converted into the mono-alcoholate. One mole of the dichloro derivative described in the third formula can then be treated with two moles of the mono-dialcoholate under conditions which result in substantially linear combination only. A product of this type is manufactured by the Shell Chemical Company and is sold under the name of "Epon" resin. These are suitable resins.

The resins herein described, and illustrated by the foregoing examples, as materials from which to produce oxyalkylated products for use in the practice of the invention, are obtained from phenols by means of resinification reactions which involve nuclear phenolic hydrogen atoms and in which the final product as employed is still essentially an aromatic compound. A wide variety of phenolic resins have been illustrated, either above or by reference to application Serial No. 8,722, and it is to be understood that each of these resins, on oxyalkylation, gives products useful for demulsification, providing the oxyalkylation be carried to an extent such that there is introduced at least two oxyalkylene groups for each phenolic radical and that the extent of oxyalkylation be such as to introduce hydrophile property sufficient so that the product has emulsifying properties, or is self-dispersible, that is, is sub-surface-active or surface-active. We have found that if the only groups which contribute a reactive hydrogen atom are phenolic hydroxyls, the resin should have a minimum hydroxyl value of 20 to 30, and advantageously should have a hydroxyl value much in excess of this, for example, from 60 to 120 up to 300 to 350 or more. If there is present some other radical susceptible to oxyalkylation such as a carboxyl radical, an amino or amido radical having a nitrogen-linked hydrogen atom, an alkanol radical or the like, useful products are obtained from resins having relatively low phenolic hydroxyl values, in some cases lower than the 20 to 30 specified.

The resins described may be obtained entirely from a phenolic material with a material which gives suitable bridging radicals such as an aldehyde, ketone, acetylene, sulfur chloride or the like, or from a phenolic reactant along with another reactant such as urea. We have found that the compounds in which the phenolic radical is contributed entirely, or at least in part, by a phenolic nucleus having at least 10 carbon atoms have marked advantages as compared with products derived from resins in which the phenolic radical is entirely derived from lower phenols, such as the cresols and phenol itself.

If the phenol used in preparing the resin, or another constituent used in preparing the resin, contributes a reactive or labile hydrogen atom other than the phenolic hydrogen as, for example, a carboxy radical where salicylic acid is used, it is frequently of advantage to block this radical, as by esterification, prior to oxyalkylation, although this reactive position may be oxyalkylated along with the phenolic hydroxyls.

In a number of the foregoing examples, phenols have been identified without specific designation of the position of substitution or the structure of the substituent radical. In such cases, the phenols meant are either the commercial products distributed under these names, or, if the products are not commercially available, the products obtained by customary syntheses from phenol, meta-cresol or 3,5-xylenol, and consist mainly of the para-substituted product, usually associated with some of the ortho-substituted product, perhaps a very small proportion of meta-substituted material, some impurities, etc. Also, it is to be understood that all of the products of the foregoing examples, unless it is otherwise stated in the example, are soluble in xylene, at least to an extent sufficient to permit the use of xylene as the solvent in oxyalkylation.

Having obtained a suitable resin of the kind described, such resin is subjected to treatment with a low molal reactive alpha-beta olefin oxide so as to render the product distinctly hydrophile in nature as indicated by the fact that it becomes self-emulsifiable or miscible or soluble in water, or self-dispersible, or has emulsifying properties. The olefin oxides employed are characterized by the fact that they contain not over 4 carbon atoms and are selected from the class consisting of ethylene oxide, propylene oxide, butylene oxide, glycide, and methylglycide. Glycide may be, of course, considered as a hydroxy propylene oxide and methyl glycide as a hydroxy butylene oxide. In any event, however, all such reactants contain the reactive ethylene oxide ring and may be best considered as derivatives of or substituted ethylene oxides. The solubilizing effect of the oxide is directly proportional to the percentage of oxygen present, or specifically, to the oxygen-carbon ratio.

In ethylene oxide, the oxygen-carbon ratio is 1:2. In glycide, it is 2:3; and in methyl glycide, 1:2. In such compounds, the ratio is very favorable to the production of hydrophile or surface-active properties. However, the ratio, in propylene oxide, is 1:3, and in butylene oxide 1:4. Obviously, such latter two reactants are satisfactorily employed only where the resin composition is such as to make incorporation of the desired property practical. In other cases, they may produce marginally satisfactory derivatives, or even unsatisfactory derivatives. They are usable in conjunction with the three more favorable alkylene oxides in all cases. For instance, after one or several propylene oxide or butylene oxide molecules have been attached to the resin molecule, oxyalkylation may be satisfactorily continued using the more favorable members of the class, to produce the desired hydrophile product. Used alone, these two reagents may in some cases fail to produce sufficiently hydrophile derivatives because of their relatively low oxygen-carbon ratios.

Thus, ethylene oxide is much more effective than propylene oxide, and propylene oxide is more effective than butylene oxide. Hydroxy propylene oxide (glycide) is more effective than propylene oxide. Similarly, hydroxy butylene oxide (methyl glycide) is more effective than butylene oxide. Since ethylene oxide is the cheapest alkylene oxide available and is reactive, its use is definitely advantageous, and especially in light of its high oxygen content. Propylene oxide is less reactive than ethylene oxide, and butylene oxide is definitely less reactive than propylene oxide. On the other hand, glycide may react with almost explosive violence and must be handled with extreme care.

The oxyalkylation of resins of the kind from which the products used in the practice of the present invention are prepared is advantageously catalyzed by the presence of an alkali. Useful alkaline catalysts include soaps, sodium acetate, sodium hydroxide, sodium methylate, caustic potash, etc. The amount of alkaline catalyst usually is between 0.2% to 2%. The temperature employed may vary from room temperature to as high as 200° C. The reaction may be conducted with or without pressure, i. e., from zero pressure to approximately 200 or even 300 pounds gauge pressure (pounds per square inch). In a general way, the method employed is substantially the same procedure as used for oxyalkylation of other organic materials having reactive phenolic groups.

It may be necessary to allow for the acidity of a resin in determining the amount of alkaline catalyst to be added in oxyalkylation. For instance, if a nonvolatile strong acid such as sulfuric acid is used to catalyze the resinification reaction, presumably after being converted into a sulfonic acid, it may be necessary and is usually advantageous to add an amount of alkali equal stoichiometrically to such acidity, and include added alkali over and above this amount as the alkaline catalyst.

It is advantageous to conduct the oxyethylation in presence of an inert solvent such as xylene, cymene, decalin, ethylene glycol diethylether, diethyleneglycol diethylether, or the like, although with many resins, the oxyalkylation proceeds satisfactorily without a solvent. Since xylene is cheap and may be permitted to be present in the final product used as a demulsifier, it is our preference to use xylene. This is particularly true in the manufacture of products from low-stage resins, i. e., of 3 and up to and including 7 units per molecule.

If a xylene solution is used in an autoclave as hereinafter indicated, the pressure readings of course represent total pressure, that is, the combined pressure due to xylene and also due to ethylene oxide or whatever other oxyalkylating agent is used. Under such circumstances it may be necessary at times to use substantial pressures to obtain effective results, for instance, pressures up to 300 pounds along with correspondingly high temperatures, if required.

However, even in the instance of high-melting resins, a solvent such as xylene can be eliminated in either one of two ways: After the introduction of approximately 2 or 3 moles of ethylene oxide, for example, per phenolic nucleus, there is a definite drop in the hardness and melting point of the resin. At this stage, if xylene or a similar solvent has been added, it can be eliminated by distillation (vacuum distillation if desired) and the subsequent intermediate, being comparatively soft and solvent-free, can be reacted further in the usual manner with ethylene oxide or some other suitable reactant.

Another procedure is to continue the reaction to completion with such solvent present and then eliminate the solvent by distillation in the customary manner.

Another suitable procedure is to use propylene oxide or butylene oxide as a solvent as well as a reactant in the earlier stages along with ethylene oxide, for instance, by dissolving the powdered resin in propylene oxide even though oxyalkylation is taking place to a greater or lesser degree. After a solution has been obtained which represents the original resin dissolved in propylene oxide or butylene oxide, or a mixture which includes the oxyalkylated product, ethylene oxide is added to react with the liquid mass until hydrophile properties are obtained. Since ethylene oxide is more reactive than propylene oxide or butylene oxide, the final product may contain some unreacted propylene oxide or butylene oxide which can be eliminated by volatilization or distillation in any suitable manner.

Attention is directed to the fact that the resins herein described must be fusible or soluble in an organic solvent. Fusible resins invariably are soluble in one or more organic solvents such as those mentioned elsewhere herein. It is to be emphasized, however, that the organic solvent employed to indicate or assure that the resin meets this requirement need not be the one used in oxyalkylation. Indeed solvents which are susceptible to oxyalkylation are included in this group of organic solvents. Examples of such solvents are alcohols and alcohol-ethers. However, where a resin is soluble in an organic solvent, there are usually available other organic solvents which are not susceptible to oxyalkylation, useful for the oxyalkylation step. In any event, the organic solvent-soluble resin can be finely powdered, for instance to 100 to 200 mesh, and a slurry or suspension prepared in xylene or the like, and subjected to oxyalkylation. The fact that the resin is soluble in an organic solvent or the fact that it is fusible means that it consists of separate molecules.

Considerable of what is said immediately hereinafter is concerned with the ability to vary the hydrophile properties of the compounds used in the process from minimum hydrophile properties to maximum hydrophile properties. Even more remarkable, and equally difficult to explain, are the versatility and utility of those compounds as one goes from minimum hydrophile property to ultimate maximum hydrophile property. For instance, minimum hydrophile property may be described roughly as the point where two ethyleneoxy radicals or moderately in excess thereof are introduced per phenolic hydroxyl. Such minimum hydrophile property or sub-surface-activity or minimum surface-activity means that the product shows at least emulsifying properties or self-dispersion in cold or even warm distilled water (15° to 40° C.) in concentrations of 0.5% to 5.0%. These materials are generally more soluble in cold water than warm water, and may even be very insoluble in boiling water. Moderately high temperatures aid in reducing the viscosity of the solute under examination. Sometimes if one continues to shake a hot solution, even though cloudy or containing an insoluble phase, one finds that solution takes place to give a homogeneous phase as the mixture cools. Such self-dispersion tests are conducted in the absence of an insoluble solvent.

When the hydrophile-hydrophobe balance is above the indicated minimum (2 moles of ethylene oxide per phenolic nucleus or the equivalent) but insufficient to give a sol as described immediately preceding, then, and in that event hydrophile properties are indicated by the fact that one can produce an emulsion by having present 10% to 50% of an inert solvent such as xylene. All that one need to do is to have a xylene solution within the range of 50 to 90 parts by weight of oxyalkylated derivatives and 50 to 10 parts by weight of xylene and mix such solution with one, two or three times its volume of distilled water and shake vigorously so as to obtain an emulsion which may be of the oil-in-water type or the water-in-oil type (usually the former) but, in any event, is due to the hydrophile-hydrophobe balance of the oxyalkylated derivative. We prefer simply to use the xylene diluted derivatives, which are described elsewhere, for this test rather than evaporate the solvent and employ any more elaborate tests, if the solubility is not sufficient to permit the simple sol test in water previously noted.

If the product is not readily water soluble it may be dissolved in ethyl or methyl alcohol, ethylene glycol diethylether, or diethylene glycol diethylether, with a little acetone added if required, making a rather concentrated solution, for instance 40% to 50%, and then adding enough of the concentrated alcoholic or equivalent solution to give the previously suggested 0.5% to 5.0% strength solution. If the product is self-dispersing (i. e., if the oxyalkylated product is a liquid or a liquid solution self-emulsifiable), such sol or dispersion is referred to as at least semi-stable in the sense that sols, emulsions, or dispersions prepared are relatively stable, if they remain at least for some period of time, for instance 30 minutes to two hours, before showing any marked separation. Such tests are conducted at room temperature (22° C.). Needless to say, a test can be made in presence of an insoluble solvent such as 5% to 15% of xylene, as noted in previous examples. If such mixture, i. e., containing a water-insoluble solvent, is at least semi-stable, obviously the solvent-free product would be even more so. Surface-activity representing an advanced hydrophile-hydrophobe balance can also be determined by the use of conventional measurements hereinafter described. One outstanding characteristic property indicating surface-activity in a material is the ability to form a permanent foam in dilute aqueous solution, for example, less than 0.5%, when in the higher oxyalkylated stage, and to form an emulsion in the lower intermediate stages of oxyalkylation.

Allowance must be made for the presence of a solvent in the final product in relation to the hydrophile properties of the final product. The principle involved in the manufacture of the herein contemplated compounds for use as demulsifying agents, is based on the conversion of a hydrophobe or non-hydrophile compound or mixture of compounds into products which are distinctly hydrophile, at least to the extent that they have emulsifying properties or are self-emulsifying; that is, when shaken with water they produce stable or semi-stable suspensions, or, in the presence of a water-insoluble solvent, such as xylene, an emulsion. In demulsification, it is sometimes preferable to use a product having markedly enhanced hydrophile properties over and above the initial stage of self-emulsifiability, although we have found that with products of the type used herein, most efficacious results are obtained with products which do not have hydrophile properties beyond the stage of self-dispersibility.

More highly oxyalkylated resins give colloidal solutions or sols which show typical properties comparable to ordinary surface-active agents. Such conventional surface-activity may be measured by determining the surface tension and the interfacial tension against paraffin oil or the like. At the initial and lower stages of oxyalkylation, surface-activity is not suitably determined in this same manner but one may employ an emulsification test. Emulsions come into existence as a rule through the presence of a surface-active emulsifying agent. Some surface-active emulsifying agents such as mahogany soap may produce a water-in-oil emulsion or an oil-in-water emulsion depending upon the ratio of the two phases, degree of agitation, concentration of emulsifying agent, etc.

The same is true in regard to the oxyalkylated resins herein specified, particularly in the lower stage of oxyalkylation, the so-called "sub-surface-active" stage. The surface-active properties are readily demonstrated by producing a xylene-water emulsion. A suitable procedure is as follows: The oxyalkylated resin is dissolved in an equal weight of xylene. Such 50–50 solution is then mixed with 1–3 volumes of water and shaken to produce an emulsion. The amount of xylene is invariably sufficient to reduce even a tacky resinous product to a solution which is readily dispersible. The emulsions so produced are usually xylene-in-water emulsions (oil-in-water type) particularly when the amount of distilled water used is at least slightly in excess of the volume of xylene solution and also if shaken vigorously. At times, particularly in the lowest stage of oxyalkylation, one may obtain a water-in-xylene emulsion (water-in-oil type) which is apt to reverse on more vigorous shaking and further dilution with water.

If in doubt as to this property, comparison with a resin obtained from para-tertiary butylphenol and formaldehyde (ratio 1 part phenol to 1.1 formaldehyde) using an acid catalyst and then followed by oxyalkylation using 2 moles of ethylene oxide for each phenolic hydroxyl, is helpful. Such resin prior to oxyalkylation has a molecular weight indicating about 4½ units per resin molecule. Such resin, when diluted with an equal weight of xylene, will serve to illustrate the above emulsification test.

In a few instances, the resin may not be sufficiently soluble in xylene alone but may require the addition of some ethylene glycol diethylether as described elsewhere. It is understood that such mixture, or any other similar mixture, is considered the equivalent of xylene for the purpose of this test.

In many cases, there is no doubt as to the presence or absence of hydrophile or surface-active characteristics in the products used in accordance with this invention. They dissolve or disperse in water; and such dispersions foam readily. With borderline cases, i. e., those which show only incipient hydrophile or surface-active property (sub-surface-activity) tests for emulsifying properties or self-dispersibility are useful. The fact that a reagent is capable of producing a dispersion in water is proof that it is distinctly hydrophile. In doubtful cases, comparison can be made with the butylphenol-formaldehyde resin analog wherein 2 moles of ethylene oxide have been introduced for each phenolic nucleus.

The presence of xylene or an equivalent water-insoluble solvent may mask the point at which a solvent-free product on mere dilution in a test tube exhibits self-emulsification. For this reason, if it is desirable to determine the approximate point where self-emulsification begins, then it is better to eliminate the xylene or equivalent from a small portion of the reaction mixture and test such portion. In some cases, such xylene-free resultant may show initial or incipient hydrophile properties, whereas in presence of xylene such properties would not be noted. In other cases, the first objective indication of hydrophile properties may be the capacity of the material to emulsify an insoluble solvent such as xylene. It is to be emphasized that hydrophile properties herein referred to are such as those exhibited by incipient self-emulsification or the presence of emulsifying properties and go through the range of homogeneous dispersibility or admixture with water even in presence of added water-insoluble solvent and minor proportions of common electrolytes as occur in oil field brines.

Elsewhere, it is pointed out that an emulsification test may be used to determine ranges of surface-activity and that such emulsification tests employ a xylene solution. Stated another way, it is really immaterial whether a xylene solution produces a sol or whether it merely produces an emulsion.

In light of what has been said previously in regard to the variation of range of hydrophile properties, and also in light of what has been said as to the variation in the effectiveness of various alkylene oxides, and most particularly of all ethylene oxide, to introduce hydrophile character, it becomes obvious that there is a wide variation in the amount of alkylene oxide employed, as long as it is at least 2 moles per phenolic nucleus, for producing products useful for the practice of this invention. Another variation is the molecular size of the resin chain. It is well known that the size and nature or structure of the resin polymer obtained varies somewhat with the conditions of reaction, the proportions of reactants, the nature of the catalyst, etc.

Based on molecular weight determinations, most of the resins prepared as herein described, particularly in the absence of a secondary heating step, contain 3 to 6 or 7 structural units, with approximately 4½ or 5½ nuclei as an average. More drastic intensive resinification yields resins of greater chain length. Such more intensive resinification is a conventional procedure and may be employed if desired. Molecular weight, of course, is measured by any suitable procedure, particularly by cryoscopic methods; but using the same reactants and using more drastic conditions of resinification one usually finds that higher molecular weights are indicated by higher melting points of the resins and a tendency to decreased solubility. See what has been said elsewhere herein in regard to a secondary step involving the heating of a resin with or without the use of vacuum.

One procedure which can be employed in the use of a new resin, if of a nature such that the only alkylene oxide-reactive hydrogen atoms are those of the phenolic hydroxyls, to prepare products for use in the process of the invention, is to determine the hydroxyl value by the Verley-Bölsing method or its equivalent. The resin as such, or in the form of a solution as described, is then treated with ethylene oxide in presence of 0.5% to 2% of sodium methylate as a catalyst in stepwise fashion. The conditions of reaction, as far as time or per cent are concerned, are within the range previously indicated. With suitable agitation the ethylene oxide, if added in molecular proportion, combines within a comparatively short time, for instance a few minutes to 2 to 6 hours, but in some instance requires as much as 8 to 24 hours. A useful temperature range is from 125° to 225° C. The completion of the reaction of each addition of ethylene oxide in stepwise fashion is usually indicated by the reduction or elimination of pressure. An amount conveniently used for each addition is generally equivalent to a mole or two moles of ethylene oxide per hydroxyl radical. When the amount of ethylene oxide added is equivalent to approximately 50% by weight of the original resin, a sample is tested for incipient hydrophile properties by simply shaking up in water as is, or after the elimination of the solvent if a solvent is present. The amount of ethylene oxide used to obtain a useful demulsifying agent as a rule varies from 70% by weight of the original resin to as much as five or six times the weight of the original resin.

In the case of a resin derived from para-tertiary butylphenol, as little as 50% by weight of ethylene oxide may give suitable solubility. With propylene oxide, even a greater molecular proportion is required and sometimes a resultant of only limited hydrophile properties is obtainable. The same is true to even a greater extent with butylene oxide. The hydroxylated alkylene oxides are more effective in solubilizing properties than the comparable compounds in which no hydroxyl is present.

Attention is directed to the fact that in the subsequent examples reference is made to the stepwise addition of the alkylene oxide, such as ethylene oxide. It is understood, of course, there is no objection to the continuous addition to alkylene oxide until the desired stage of reaction is reached. In fact, there may be less of a hazard involved and it is often advantageous to add the alkylene oxide slowly in a continuous stream and in such amount as to avoid exceeding the higher pressures noted in the various examples or elsewhere.

Many suitable resins are comparatively soft or pitch-like resin at ordinary temperatures. Such resins become comparatively fluid at 110° to 165° C. as a rule, and thus can be readily oxyalkylated, preferably oxyethylated, without the use of a solvent.

What has been said previously is not intended to suggest that any experimentation is necessary to determine the degree of oxyalkylation, and particularly oxyethylation. What has been said previously is submitted primarily to emphasize the fact that these remarkable oxyalkylated resins having surface activity show unusual properties as the hydrophile character varies from a minimum to an ultimate maximum. One should not underestimate the utility of any of these products in a surface-active or sub-surface-active range without testing them for demulsification. A few simple laboratory tests which can be conducted in a routine manner will usually give all the information that is required.

For instance, a simple rule to follow is to prepare an organic solvent-soluble resin. Oxyethylate such resin, using the following four ratios of moles of ethylene oxide per phenolic unit equivalent: 2 to 1; 6 to 1; 10 to 1; and 15 to 1. From a sample of each product remove any solvent that may be present, such as xylene. Prepare 0.5% and 5.0% solutions in distilled water, as previously indicated. A mere examination of such series will generally reveal an approximate range of minimum hydrophile character, moderate hydrophile character, and maximum hydrophile character. If the 2 to 1 ratio does not show minimum hydrophile character by test of the solvent-free product, then one should test its capacity to form an emulsion when admixed with xylene or other insoluble solvent. If neither test shows the required minimum hydrophile property, repetition using 2½ to 4 moles per phenolic nucleus will serve. Moderate hydrophile character should be shown by either the 6 to 1 or 10 to 1 ratio. Such moderate hydrophile character is indicated by the fact that the sol in distilled water within the previously mentioned concentration range is a permanent translucent sol when viewed in comparatively thin layer, for instance the depth of a test tube. Ultimate hydrophile character is usually shown at the 15 to 1 ratio test in that adding a small amount of an insoluble solvent, for instance 5% of xylene, yields a product which will give, at least temporarily, a transparent or translucent sol of the kind just described. The formation of a permanent foam, when a 0.5% to 5.0% aqueous solution is shaken, is an excellent test for surface activity. Previous reference has been made to the fact that other oxyalkylating agents may require the use of increased amounts of alkylene oxide. However, if one does not even care to go to the trouble of calculating molecular weights, one can simply arbitrarily prepare compounds containing ethylene oxide equivalent to about 50% to 75% by weight, for example 65% by weight, of the resin to be oxyethylated; a second example using approximately 200% to 300% by weight, and a third example using about 500% to 750% by weight, to explore the range of hydrophile-hydrophobe balance.

A practical examination of the factor of oxyalkylation level can be made by a very simple test using a pilot plant autoclave having a capacity of about 10 to 15 gallons as hereinafter described. Such laboratory-prepared routine compounds can then be tested for solubility and, generally speaking, this is all that is required to give a suitable variety covering the hydrophile-hydrophobe range. All these tests, as stated, are intended to be routine tests and nothing more. They are intended to teach a person, even though unskilled in oxyethylation or oxyalkylation, how to prepare in a perfectly arbitrary manner, a series of compounds illustrating the hydrophile-hydrophobe range.

If one purchases a thermoplastic or fusible resin on the open market selected from a suitable number which are available, one might have to make certain determinations in order to make the quickest approach to the appropriate oxyalkylation range. For instance, one should know (a) the molecular size and the number of phenolic units; (b) the nature of the bridging and/or modifying radicals; and (c) the nature of any substituents. With such information one is in substantially the same position as if one had personally made the resin prior to oxyethylation.

For instance, the molecular weight of the internal structural units of the resin of the following over-simplified formula

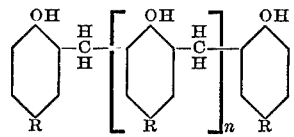

is given approximately by the formula: (Mol. Wt. of phenol —2) plus Mol. Wt. of methylene or substituted methylene radical. The molecular weight of the resin would be $n$ times the value for the internal unit plus the values for the terminal units. The left-hand terminal unit of the above structural formula, it will be seen, is identical with the recurring internal unit except that it has one extra hydrogen. The right-hand terminal unit lacks the methylene bridge element. Using one internal unit of a resin as the basic element, a resin's molecular weight is given approximately by taking ($n$ plus 2) times the weight of the internal element. Where the resin molecule has only 3 phenolic nuclei as in the structure shown, this calculation will be in error by several percent; but as it grows larger, to contain 6, 9, or 12 phenolic nuclei, the formula comes to be more than satisfactory. Using such an approximate weight, one need only introduce, for example, two molal weights of ethylene oxide or slightly more, per phenolic nucleus, to produce a product of minimal hydrophile character. Further oxyalkylation gives enhanced hydrophile character. Although we have prepared and tested a large number of oxyethylated products of the type described herein, we have found no instance where the use of less than 2 moles of ethylene oxide per phenolic nucleus gave desirable products.

Certain of the modified resins, such as the phenol modified cumarone-indene resins, or indene-cumarone-modified phenol-aldehyde resins, naphthalene-phenol-aldehyde resins, and the like, frequently require the use of comparatively larger amount of the alkylene oxide, i. e., substantially more than the minimum of 2 moles of alkylene oxide per phenolic hydroxyl group, because the phenol nucleus appears in comparatively fewer structural units per resin molecule, for example, only 1 in 2, or 1 in 3, or even 1 in 5. We have found that the hydroxyl value of such resins may vary from as little as 20 to 30 up to very much larger values, and while hydroxyl value is not necessarily a complete index of oxyalkylation susceptibility, such resins frequently require, for the necessary hydrophile property, considerably more alkylene oxide than 2 moles per hydroxyl group. This will be subsequently illustrated. However, we have also found that the guides based upon the weight of the resins and the weight of the alkylene oxide, above discussed are in general applicable to resins of this character as well as those other phenolic resins.

The following Examples 1b–17b are included to exemplify the production of suitable oxyalkylated products from resins, specifically, resins described in a number of the foregoing Examples 1a to 45a, giving exact and complete details for the carrying out of the procedure. We direct attention to Examples 1a–362a and Examples 1b–76b of our application Serial No. 8,722 as illustrating the same matters.

Example 1b

The resin employed is the acid-catalyzed paratertiary butylphenolformaldehyde resin of Example 1a. (Such resin can be purchased in the open market.) The resin is powdered and mixed with an equal weight of xylene so as to obtain solution by means of a stirring device employing a reflux condenser. 170 grams of the resin are dissolved in or mixed with 170 grams of xylene. To the mixture there is added 1.7 grams of sodium methylate powder. The solution or suspension is placed in an autoclave and approximately 400 grams of ethylene oxide by weight are added in 6 portions of approximately 65 to 75 grams each. After each portion is added, the reaction is permitted to take place for approximately 4 hours. The temperature employed is approximately 150° to 165° C. and a maximum gauge pressure of approximately 150 pounds per square inch. The minimum gauge pressure is approximately 20 pounds per square inch. At the end of each 4-hour period there is no further drop in pressure, thus indicating that all the ethylene oxide present has reacted and the pressure registered on the gauge represents the vapor pressure of xylene at the indicated temperature. After the sixth and final portion of ethylene oxide has been added, a test is made on the resultant.

In one such operation, the resultant, when cold, was a viscous opaque liquid, emulsifiable in water even in presence of the added xylene. This indicated that incipient emulsification in absence of xylene probably appeared at the completion of the fourth addition of ethylene oxide. In other words, 150 grams or 175 grams of ethylene oxide are sufficient to give incipient hydrophile properties in absence of xylene. The initial point approximates ethylene oxide equal to slightly less than 100% of the weight of the initial resin. In this instance in order to obtain greater solubility, the amount of ethylene oxide used for reaction was increased by a second series of additions using substantially the same conditions of reaction as noted previously. Such series was continued until, as an upper limit, 500 grams of ethylene oxide had been introduced on the basis of the original 170 grams of resin. See the attached table for data as to the compound in which the ratio of ethylene oxide to resin is about 2:1. A compound of this constitution, containing a small amount of xylene, was light amber in color, miscible with water and had a viscosity resembling that of castor oil.

Example 2b

The same reactants, and procedure were employed as in Example 1b preceding, except that propylene oxide was employed instead of ethylene oxide. The resultant, even on the addition of the alkylene oxide in the weight proportions of the previous example, has diminished hydrophile properties in comparison with the resultants of Example 1b. This illustrates the point that propylene oxide and butylene oxide give products of lower levels of hydrophile properties than does ethylene oxide.

Example 3b

The same reactants and procedure were followed as in Example 1b, except that one mole of glycide was employed initially per hydroxyl radical. This particular reaction was conducted with extreme care and the glycide was added in small amounts representing fractions of a mole. Ethylene oxide was then added, following the procedure of Example 1b, to produce products of greater hydrophile properties. We are extremely hesitant to suggest even the experimental use of glycide and methylglycide for the reason that disastrous results may be obtained even in experimentation with laboratory quantities.

Example 4b

The same procedure is followed as in Example 1b except that instead of employing the resin employed in Example 1b, there was substituted instead an equal weight of resin of Example 2a. The products obtained were similar in appearance, color and viscosity to those of Example 1b.

Example 5

The same reactants and procedure are employed as in Example 1b, except that the acid catalyzed amylphenol formaldehyde resin of Example 3a is used. (Such resin can be purchased in the open market.) Suitable amylphenol resins include those of Examples 4a, 5a and 6a. The oxyethylated products in color, appearance, viscosity, etc., are like the products of Example 1b.

Example 6b

The same reactants and procedure were employed as in Example 1b, except that the acid-catalyzed styrylphenol-formaldehyde resin of Example 11a was used instead of the butylphenol resin. The oxyethylated products are similar in appearance, color, solubility, etc., to the products of Example 1b.

Example 7b

The resin used was the cardanol-formaldehyde resin of Example 26a. 8200 grams of the resin solution, containing 49% solvent (xylene) was oxyalkylated, after the addition of 106 grams of sodium methylate with a total of 5850 grams of ethylene oxide added in six batches, the first five being 900 and the last 1350 grams, the procedure followed being the same as that of Example 1b. The first addition was carried out at 113° C. and 80 pounds in one-quarter hour; the second at 115° C. and 65 pounds in one-quarter hour; the third at 150° C. and 70 pounds in one-quarter hour; the fourth at 115° C. and 50 pounds in one-quarter hour; the fifth at 117° C. and 250 pounds in one-quarter hour; and the sixth at 155° C. and 50 pounds in one-half hour. At the end of the third addition, the product was emulsifiable, at the end of the fourth, it was becoming soluble, at the end of the fifth it was almost soluble, and at the end of the sixth was soluble.

Example 8b

The resin described in Example 31a was oxyethylated in the following manner:

A solution of the resin was prepared as follows:

|  | Grams |
|---|---|
| Resin | 921 |
| Xylene | 585 |
| Diethylene glycol diethylether | 425 |

To this solution there was added 20 grams sodium methylate. The solution was placed in the autoclave and a total of approximately 3,000 grams of ethylene oxide were added in six batches of 500 grams each. The first addition was completed in 14 hours using a maximum temperature of 160° C. and a gauge pressure of 135 pounds per square inch. In the second batch, the same operating conditions were employed but the ethylene oxide was completely absorbed in 5½ hours. The third batch was added in approximately 6 hours at a temperature of 155° C. and a pressure of 121 pounds. In the fourth batch the time required was 6 hours, the temperature 153° C. and the pressure, 119 pounds. The fifth batch was added in 6½ hours at a temperature of 150° and a pressure of 125 pounds. The last batch required 10 hours for addition, at a temperature of 153° C., and a pressure of 145 pounds. During the oxyethylation, constant stirring was employed. The final product was a viscous liquid of an amber color and dissolved or mixed with water to give a somewhat opaque solution showing a very small amount of a precipitate. The product contained approximately 9.36% of diethylene glycol diethylether and approximately 12.9% of xylene.

Example 9b

The same procedure was employed as in Example 8b, except that the resin employed was that of Example 32a. The final product, however, differed in the following respects: The color was somewhat darker, the product was definitely thinner, and gave a substantially clear solution in water showing just slight turbidity without any precipitate.

Example 10b

To the molten resinous mass of Example 27a, at a temperature of about 150–170° C., ethylene oxide was added until about 50 parts had been absorbed. The fused mass was then poured on a metal sheet, forming a bright, hard and odorless resinous mass.

Example 11b 177 grams of the hard, brittle resin of Example 28a were ground to a powder and mixed with 4 grams of sodium methylate. The dry mixture was placed in an autoclave and 100 grams of ethylene oxide added without any added solvent. Heat was turned on and the temperature was raised to 150° for one hour. No attempt was made to stir the autoclave until the maximum temperature had been reached. At this time the pressure was approximately 95 pounds. At the end of the hour's heating, with stirring, at 150° C., the autoclave was cooled off and a second 100 grams of ethylene oxide added. During the second treatment a pressure of 190 pounds was reached and the temperature maintained was the same, 150° C., and the time of reaction was 2 hours. The autoclave was again cooled and a third batch of 100 grams of ethylene oxide was added. A temperature of 160° C. was employed, with a pressure of 80 pounds. The time required was 3 hours. A fourth batch of ethylene oxide was added, after cooling. A temperature of 156° C. was employed with a pressure of 100 pounds. At the end of this fourth treatment 400 grams of ethylene oxide had been added to 177 grams of resin, without any solvent present. The final product was water-soluble with a slight turbidity, and the solution foamed vigorously on shaking. The product was a non-viscous, amber colored liquid.

Example 12b

The resin of Example 33a was subjected to oxyalkylation in the following manner:

4,720 grams, including the 25% xylene added, were mixed with 20 grams of sodium methylate and subjected to oxyethylation by treating with four portions of ethylene oxide weighing 800 grams each, or a total of 3,200 grams. In the addition of all four batches, the temperature employed was 150° C. and the pressure 130 pounds per square inch gauge pressure. It required four hours to add the first two batches and 12 hours to add the second two. The material was water-miscible but not absolutely soluble since there was a very minor portion which seemed to settle out slowly. The appearance of the material was amber, with a moderate viscosity. It had a very repugnant odor, probably due to the sulfur chloride used in preparing it.

Example 13b 2,000 grams of the resin of Example 34a (practically solvent-free) were mixed with 1,000 grams of xylene and 40 grams of sodium methylate. The total amount of ethylene oxide employed was 3,000 grams, added in six batches of 500 grams each. In the first batch, the time required to add the ethylene oxide was three hours. The temperature was 140° C. and the pressure was 102 pounds per square inch gauge pressure. At the end of this period, the product was still water-insoluble and not particularly viscous. The second batch required seven hours to add, the temperature employed was 140° C. and the pressure 128 pounds per square inch. At the end of this period, the product began to show definite emulsifiability in water. The third batch required ten hours for addition, the temperature was 160°

C., and the pressure 130 pounds per square inch. After the addition of the third batch of ethylene oxide, 10 grams more of sodium methylate were added as a catalyst. During the last three batches, the addition was more rapid, 2½ hours being required to add the ethylene oxide. The temperature varied from about 143° to 160° C. The pressure varied from as little as 87 to 130 pounds. The final product was readily water emulsifiable, did not give an entirely clear solution, and had a somewhat offensive odor.

*Example 14b*

2,000 grams of an amylphenol sulfide resin were dissolved into 2,000 grams of xylene and 40 grams of sodium methylate were added. The total amount of ethylene oxide added was 4,000 grams in four batches of 1,000 grams each. The time required to add the first batch was 14 hours. The temperature was 160° C. and the pressure was 150 pounds gauge pressure. The product was a deep amber-colored oil which was water-emulsifiable. The second batch was added under practically the same conditions as the first batch except that the pressure was only 150 pounds. The emulsifiability of the product was increased just slightly over that resulting from the addition of the first batch of ethylene oxide. It required five hours to add the third batch of ethylene oxide and four hours to add the last batch. The temperature during the addition of the third batch was 162° C. and, during the last batch, 150° C. The pressure during the addition of the third batch was 140 pounds and during the last batch, 110 pounds. The final product was a non-viscous, deep amber-colored liquid which was water-emulsifiable. The solubility had not increased largely over the addition of the second batch.

*Example 15b*

290.0 grams of the resin of Example 38a were dissolved in 163.6 grams of diethyleneglycol diethylether. 6 grams of sodium methylate were added. The mixture was placed in the laboratory autoclave along with 100 grams of ethylene oxide and subjected to stirring for 5 hours at a temperature of 130° C. The maximum pressure during this period was 65 pounds. At the end of this period the product showed a distinct tendency to become water-emulsifiable. 100 more grams of ethylene oxide were added and the mixture heated for 2 hours at 142° C. with constant stirring. The maximum pressure during this period was 75 pounds per square inch, gauge pressure. At the end of this period the product was becoming soluble. Another 100 grams of ethylene oxide were added and reacted in a third period of two hours' time, at a maximum temperature of 150° C., and a maximum pressure of 110 pounds gauge. The final product obtained was a water-soluble, non-viscous, amber-colored resin.

*Example 16b*

4,085 grams of the xylene solution of the resin obtained in Example 39a were mixed with an additional 2,500 grams of xylene and with 40 grams of sodium methylate. The amount of ethylene oxide added was 9,000 grams of which 5,000 grams were added in five portions of 1,000 grams each. During these additions the operating conditions were as follows: The time required for addition was 4 to 6 hours; the maximum temperature was 166° C.; the maximum pressure was 130 pounds per square inch. At the end of this addition of 5,000 grams the material was a non-viscous, light amber colored oil, giving a milky solution with water. This material was then treated with another 4,000 grams of ethylene oxide under substantially the same conditions. The resultant product was rather peculiar in that it was almost semi-rubbery or sub-rubbery in consistency, giving a substantially clear solution in water which foamed moderately on shaking.

*Example 17b*

The resin employed was the phenol-urea-formaldehyde resin, described in Example 43a. The resin was heated so as to remove all the solvent. 2,150 grams of this resin were mixed with 40 grams of sodium methylate and subjected to oxyalkylation with six batches of ethylene oxide, employing 1,000 grams in each batch. The first batch of 1,000 grams of ethylene oxide required six hours for addition, at 158° C., and 95 pounds per square inch gauge pressure. The resultant product was a light yellow and mush-like mass which was water-insoluble. The second batch of ethylene oxide required 5¼ hours with a temperature of 140° C. and 55 pounds per square inch gauge pressure. The resultant product was water-emulsifiable although it still contained some of the mush-like mass suspended in a viscous liquid. The third batch required one hour for addition at 146° C. and a pressure of 45 pounds per square inch. At the end of this time the product was water-soluble and the mush-like mass had apparently disappeared. The fourth addition required only ¾ hour at a temperature of 158° C. and 95 pounds per square inch. The mixture at this point was water-miscible and seemed to show some tendency to separate very slowly into two layers. The next batch of ethylene oxide was also added in ¾ of an hour at a temperature of 140° C., and a pressure of 55 pounds per square inch. The product still showed some tendency to separate but a sample taken during mixing showed that the total reaction mass was almost completely water-soluble in dilute solution and somewhat cloudy in a more concentrated solution. The final addition of ethylene oxide was made in fifteen minutes at a temperature of 150° C. with 65 pounds per square inch gauge pressure. The The resultant product was a viscous amber colored oil, almost completely water soluble, even in a fairly concentrated solution.

The resins, prior to oxyalkylation, vary from tacky, viscous liquids to hard, high-melting solids. Their color varies from a light yellow through amber, to a deep red or even almost black. In the manufacture of resins, particularly hard resins, as the reaction progresses the reaction mass frequently goes through a liquid state to a sub-resinous or semi-resinous state, often characterized by being tacky or sticky, to a final complete resin. As the resin is subjected to oxyalkylation these same physical changes tend to take place in reverse. If one starts with a solid resin, oxyalkylation tends to make it tacky or semi-resinous and further oxyalkylation makes the tackiness disappear and changes the product to a liquid. Thus, as the resin is oxyalkylated it decreases in viscosity, that is, becomes more liquid or changes from a solid to a liquid, particularly when it is converted to the water-dispersible or water-soluble stage. The color of the oxyalkylated derivative is usually considerably lighter than the original product from which it is made, varying from a pale straw color to an amber or reddish amber. The viscosity usually varies from that of an oil, like castor oil, to that of a thick viscous sirup. Some products are waxy. The presence of a solvent, such as 15% xylene or the like, thins the viscosity considerably and also reduces the color in dilution. No undue significance need be attached to the color for the reason that if the same compound is prepared in glass and in iron, the latter usually has somewhat darker color. If the resins are prepared as customarily employed in varnish resin manufacture, i. e., a procedure that excludes the presence of oxygen during the resinification and subsequent cooling of the resin, then of course the initial resin is much lighter in color. We have employed some resins which initially are almost water-white and also yield a lighter colored final product.

The same procedure as described above has been applied to a large variety of resins of the kind described previously, and we have found that these oxyalkylated products having the required minimum hydrophile properties, are all effective for use in the process of the invention. In the series of examples represented by Examples 1b through 17b, and Examples 1b to 76b of Serial No. 8,722, the amount of alkylene oxide added covers the range up to about three times the weight of the initial resin.

In our application Serial No. 8,722 there is a table which illustrates the effect of oxyalkylation of a wide range of phenolic resins, and shows that many effective compounds for demulsification purposes require but about one-half this amount of alkylene oxide compound, in particular ethylene oxide, for example, from 150% to 200% by weight. Of the products illustrated in the table in said application Serial No. 8,722, those derived from products illustrated by Examples 1a–362a of that application are useful for the practice of the present invention and illustrate it. Larger amounts of ethylene oxide, for example, amounts up to six times the weight of the initial resin may be used, even though the solubility of such products may in some cases be less than the solubility of derivatives obtained with lesser amounts of alkylene oxide.

The oxyethylated products in the presence of the solvent were liquids varying in viscosity from relative mobility to a viscosity approaching that of castor oil or lightly blown vegetable oils. They varied in color from straw colored or light amber to very dark brownish or reddish colored. It is to be understood that when these products are used for demulsification, it is unnecessary to separate them from the solvent used in their preparation, and ordinarily commercial products will, if prepared with the use of a solvent, be distributed without removal of the solvent, and frequently with the addition of other solvent materials, other agents, etc.

The following examples, Examples 1c–3c, are included to illustrate the technique of testing the effectiveness of the demulsifiers against oil field emulsions. It is to be understood that in the industrial use of these products, they are used in accordance with standard practices, some of which are subsequently described.

Example 1c

The demulsifier employed was the oxyalkylated derivative of the resin of Example 2a prepared from para-secondary butylphenol and formaldehyde using an acid catalyst oxyethylated with an amount of ethylene oxide equal in weight to the weight of the resin, following the procedure of Example 4b.

The oxyalkylated resin was prepared so the final product represented a 50% solution in xylene. The effectiveness of this oxyalkylated resin was examined by testing it in connection with an emulsion produced at the St. Gabriel field, St. Gabriel, Louisiana. The emulsion as produced was buff in color and contained approximately 70% to 80% B. S. & W., equivalent to 40% water. The oxyalkylated derivative above described was added to 100 cc. of emulsion placed in a 150 cc. bottle. The amount added was equivalent to one part of demulsifier in 25,000 parts of emulsion. The mixture was shaken for three minutes in a shaking machine employing 150 oscillations per minute. The emulsion began to change color at the end of one minute, completely changed color at the end of two minutes, and was obviously breaking, even during the agitation period, by the end of the third minute. At the end of ten minutes of quiescent settling, a distinct water layer had broken out. The emulsion was allowed to stand for one hour at approximately 90° to 100° F. All the water was broken out within less than the hour, giving a clear separation. The gravity of the recovered oil was 34° A. P. I., and the B. S. & W. content was less than $\frac{1}{10}$ of 1%. In large scale use it is not necessary to get a complete resolution within an hour's time and the amount of demulsifier required would be substantially less.

Example 2c

The demulsifier employed was the oxyalkylated derivative of the resin of Example 3a prepared from para-tertiary amylphenol and formaldehyde, using an acid catalyst, oxyethylated with an amount of ethylene oxide equal in weight to the weight of the resin following the procedure of Example 5b.

The oxyalkylated resin was prepared so the final product represented a 50% solution in xylene. The effectiveness of this oxyalkylated resin was examined by testing it in connection with an emulsion produced at the South Houston field, South Houston, Texas. The emulsion as produced was brown in color and contained approximately 70% to 75% B. S. & W., equivalent to 37% to 38% water. The oxyalkylated derivative above described was added to 100 cc. of emulsion placed in a 150 cc. bottle. The amount added was equivalent to one part of demulsifier in 25,000 parts of emulsion. The mixture was shaken for three minutes in a shaking machine employing 150 oscillations per minute. The emulsion began to change color at the end of one minute, completely changed color at the end of two minutes and was obviously breaking, even during the agitation period, by the end of the third minute. At the end of ten minutes of quiescent settling, a distinct water layer had broken out. The emulsion was allowed to stand for one hour at approximately 90° to 100° F. All the water was broken out within less than an hour, giving a clear separation. The gravity of the recovered oil was 28° A. P. I. and the B. S. & W. content was less than $2/10$ of 1%.

Example 3c

The demulsifier employed was the oxyalkylated derivative of the resin of Example 11a prepared from styrylphenol and formaldehyde, using an acid catalyst oxyethylated with an amount of ethylene oxide equal in weight to the weight of the resin, following the procedure of Example 9b.

The oxyalkylated resin was prepared so the final product represented a 50% solution in xylene. The effectiveness of this oxyalkylated resin was examined by testing it in connection with an emulsion produced at the Hastings field, Hastings, Texas. The emulsion produced was buff in color and contained approximately 65% to 70% B. S. & W., equivalent to 34% water. The oxyalkylated derivative above described was added to 100 cc. of emulsion placed in a 150 cc. bottle. The amount added was equivalent to one part of demulsifier in 25,000 parts of emulsion. The mixture was shaken for three minutes in a shaking machine employing 150 oscillations per minute. The emulsion began to change color at the end of one minute, completely changed color at the end of two minutes, and was obviously breaking, even during the agitation period, by the end of the third minute. At the end of ten minutes of quiescent settling, a distinct water layer had broken out. The emulsion was allowed to stand for one hour at approximately 90° to 100° F. All the water was broken out within less than an hour, giving a clear separation. The gravity of the recovered oil was 32° A. P. I. and the B. S. & W. content was less than $2/10$ of 1%.

Actually, in considering the ratio of alkylene oxide to add, and we have previously pointed out that this can be pre-determined using laboratory tests, it is our actual preference from a practical standpoint to make tests on a small pilot plant scale. Our reason for so doing is that we make one run, and only one, and that we have a complete series which shows the progressive effect of introducing the oxyalkylating agent, for instance, the ethyleneoxy radicals. Our preferred procedure is as follows: We prepare a suitable resin, or for that matter, purchase it in the open market. We employ 8 pounds of resin and 4 pounds of xylene and place the resin and xylene in a suitable autoclave with an open reflux condenser. We prefer to heat and stir until the solution is complete. We have pointed out that soft resins which are fluid or semi-fluid can be readily prepared in various ways, such as the use of ortho-tertiary amylphenol, ortho-hydroxydiphenyl, or by the use of higher molecular weight aldehydes than formaldehyde. If such resins are used, a solvent need not be added but may be added as a matter of convenience or for comparison, if desired. We then add a catalyst, for instance, 2% of caustic soda, in the form of a 20% to 30% solution, and remove the water of solution or formation. We then shut off the reflux condenser and use the equipment as an autoclave only, and oxyethylate until a total of 60 pounds of ethylene oxide have been added, equivalent to 750% of the original resin. We prefer a temperature of about 150° C. to 175° C. We also take samples at intermediate points as indicated in the following table:

| Percentage | Pounds of Ethylene Oxide Added per 8 pound Batch |
|---|---|
| 50 | 4.0 |
| 66⅔ | 5.33 |
| 75 | 6.0 |
| 100 | 8.0 |
| 150 | 12.0 |
| 200 | 16.0 |
| 300 | 24.0 |
| 400 | 32.0 |
| 500 | 40.0 |
| 600 | 48.0 |
| 750 | 60.0 |

Oxyethylation to 750% can usually be completed within 30 hours and frequently more quickly.

The samples taken are rather small, for instance, 2 to 4 ounces, so that no correction need be made in regard to the residual reaction mass. Each sample is divided in two. One-half the sample in placed in an evaporating dish on the steam bath overnight so as to eliminate the xylene. Then 1.5% solutions are prepared from both series of samples, i. e., the series with xylene present and the series with xylene removed.

Mere visual examination of any samples in solution may be sufficient to indicate hydrophile character or surface activity, i. e., the product is soluble, forming a colloidal sol, or the aqueous solution foams or shows emulsifying property. All these properties are related through adsorption at the interface, for example, a gas-liquid interface or a liquid-liquid interface. If desired, surface activity can be measured in any one of the usual ways using a Du Nouy tensiometer or dropping pipette, or any other procedure for measuring interfacial tension. Such tests are conventional and require no further description. Any compound having sub-surface-activity, and all derived from the same resin and oxyalkylated to a greater extent, i. e., those having a greater proportion of alkylene oxide, are useful for the practice of this invention.

Previous reference has been made to the fact that one can conduct a laboratory scale test which will indicate whether or not a resin, although soluble in solvent, will yield an insoluble rubbery product, i. e., a product which is neither hydrophile nor surface-active, upon oxyethylation particularly extensive oxyethylation. It is also obvious that one may have a solvent-soluble resin which will result in an insoluble rubber at the ultimate stages of oxyethylation but not in the earlier stages. In other words, with such resins, addition of 2 or 3 moles of the oxyalkylating agent per phenolic nucleus, particularly ethylene oxide, gives a surface-active product which is perfectly satisfactory, while more extensive oxyethylation yields an insoluble rubber, that is, an unsuitable product.

It may be well to call attention to one result which may be noted in a long drawn-out oxyalkylation, particularly oxyethylation, which would not appear in a normally conducted reaction. Reference has been made to cross-linking and its effect on solubility and also the fact that, if carried far enough, it causes incipient stringiness, then pronounced stringiness, usually followed by a semi-rubbery or rubbery stage. Incipient stringiness, or even pronounced stringiness, or even the tendency toward a rubbery stage, is not objectionable so long as the final product is still hydrophile and at least sub-surface-active. Such material frequently is best mixed with a polar solvent, such as alcohol or the like, and preferably an alcoholic solution is used. The point which we want to make here, however, is this: Stringiness or rubberization at this stage may possibly be the result of etherification. Thus, for example, if a difunctional phenol and an aldehyde produce a non-cross-linked resin molecule and if such molecule is oxyalkylated so as to introduce a plurality of hydroxyl groups in each molecule, then and in that event if subsequent etherification takes place, one is going to obtain cross-linking in the same general way that one would obtain cross-linking in other resinification reactions. Ordinarily there is little or no tendency toward etherification during the oxyalkylation step. If it does take place at all, it is only to an insignificant and undetectable degree. However, suppose that a certain weight of resin is treated with an equal weight of, or twice its weight of, ethylene oxide. This may be done in a comparatively short time, for instance, at 150° or 175° C. in 4 to 8 hours, or even less. On the other hand, if in an exploratory reaction, such as the kind previously described, the ethylene oxide were added extremely slowly in order to take stepwise samples, so that the reaction required 4 or 5 times as long to introduce an equal amount of ethylene oxide employing the same temperature, then etherification might cause stringiness or a suggestion of rubberiness. For this reason if in an exploratory experiment of the kind previously described there appears to be any stringiness or rubberiness, it may be well to repeat the experiment and reach the intermediate stage of oxyalkylation as rapidly as possible and then proceed slowly beyond this intermediate stage. The entire purpose of this modified procedure is to cut down the time or reaction so as to avoid etherification if it be caused by the extended time period.

It may be well to note one peculiar reaction sometimes noted in the course of oxyalkylation, particularly oxyethylation, of the thermoplastic resins herein described. This effect is noted in a case where a thermoplastic resin has been oxyalkylated, for instance, oxyethylated, until it gives a perfectly clear solution, even in the presence of some accompanying water-insoluble solvent such as 10% to 15% of xylene. Further oxyalkylation, particularly oxyethylation, may then yield a product which, instead of giving a clear solution as previously, gives a very milky solution suggesting that some marked change has taken place. One explanation of the above change is that the structural unit indicated in the following way where $8_n$ is a fairly large number, for instance, 10 to 20, decomposes and an oxyalkylated resin representing a lower degree of oxyethylation and a less soluble one, is generated and a cyclic polymer of ethylene oxide is produced, indicated thus:

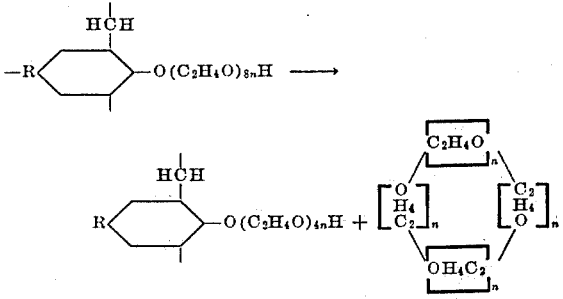

This fact, of course, presents no difficulty for the reason that oxyalkylation can be conducted in each instance stepwise, or at a gradual rate, and samples taken at short intervals so as to arrive at a point where optimum surface activity or hydrophile character is obtained if desired; for products for use in the practice of this invention, this is not necessary and, in fact, may be undesirable, i. e., reduce the efficiency of the product.

We do not know to what extent oxyalkylation produces uniform distribution in regard to phenolic hydroxyls present in the resin molecule. In some instances, of course, such distribution can not be uniform for the reason that we have not specified that the molecules of ethylene oxide, for example, be added in multiples of the units present in the resin molecule. This may be illustrated in the following manner:

Suppose the resin happens to have five phenolic nuclei. If a minimum of two moles of ethylene oxide per phenolic nucleus are added, this would mean an addition of 10 moles of ethylene oxide, but suppose that one added 11 moles of ethylene oxide, or 12, or 13, or 14 moles; obviously, even assuming the most uniform distribution possible, some of the polyethyleneoxy radicals would contain 3 ethyleneoxy units and some would contain 2. Therefore, it is impossible to specify uniform distribution in regard to the entrance of the ethylene oxide or other oxyalkylating agent. For that matter, if one were to introduce 25 moles of ethylene oxide there is no way to be certain that all chains would have 5 units; there might be some having, for example, 4 and 6 units, or for that matter 3 or 7 units. Nor is there any basis for assuming that the number of molecules of the oxyalkylating agent added to each of the molecules of the resin is the same, or different. Thus, where formulae are given to illustrate or depict the oxyalkylated products, distributions of radicals indicated are to be statistically taken. We have, however, included specific directions and specifications in regard to the total amount of ethylene oxide, or total amount of any other oxyalkylating agent, to add.

In regard to solubility of the resins and the oxyalkylated compounds, and for that matter derivatives of the latter, the following should be noted. In oxyalkylation, any solvent employed should be non-reactive to the alkylene oxide employed. This limitation does not apply to solvents used in cryoscopic determinations for obvious reasons. Attention is directed to the fact that various organic solvents may be employed to verify that the resin is organic solvent-soluble. Such solubility test merely characterizes the resin. The particular solvent used in such test may not be suitable for a molecular weight determination and, likewise, the solvent used in determining molecular weight may not be suitable as a solvent during oxyalkylation. For solution of the oxyalkylated compounds, or their derivatives, a great variety of solvents may be employed, such as alcohols, ether alcohols, cresols, phenols, ketones, esters, etc., alone or with the addition of water. Some of these are mentioned hereafter. We prefer the use of benzene or diphenylamine as a solvent in making cryoscopic measurements. The most satisfactory resins are those which are soluble in xylene or the like, rather than those which are soluble only in some other solvent containing elements other than carbon and hydrogen, for instance, oxygen or chlorine. Such solvents are usually polar, semipolar, or slightly polar in nature compared with xylene, cymene, etc.

Reference to cryoscopic measurement is concerned with the use of benzene or other suitable compound as a solvent. Such method will show that conventional resins obtained, for example, from para-tertiary amylphenol and formaldehyde in presence of an acid catalyst, will have a molecular weight indicating 3, 4, 5 or somewhat greater number of structural units per molecule. If more drastic conditions of resinification are employed or if such low-stage resin is subjected to a vacuum distillation treatment as previously described, one obtains a resin of a distinctly higher molecular weight. Any molecular weight determination used, whether cryoscopic measurement or otherwise, other than the conventional cryoscopic one employing benzene, should be checked so as to insure that it gives consistent values on such conventional resins as a control. Frequently all that is necessary to make an approximation of the molecular weight range is to make a comparison with the dimer obtained by chemical combination of two moles of the same phenol, and one mole of the same aldehyde under conditions to insure dimerization. As to the preparation of dimers from substituted phenols, see Carswell, "Phenoplasts," page 31. The increased viscosity, resinous character, and decreased solubility, etc., of the higher polymers in comparison with the dimer, frequently are all that is required to establish that the resin contains 3 or more structural units per molecule.

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil- and water-solubility. Sometimes they may be used in a form which exhibits relatively limited oil-solubility. However, since such reagents are frequently used in a ratio of 1 to 10,000 or 1 to 20,000, or 1 to 30,000, or even 1 to 40,000, or 1 to 50,000 as in desalting practice, such an apparent insolubility in oil and water is not significant because said reagents undoubtedly have solubility within such concentrations. This same fact is true in regard to the material or materials employed as the demulsifying agent of our process.

The present invention is concerned with treatment of petroleum emulsions by means of certain oxyalkylated resins which are hydrophile or sub-surface- or surface-active. Such resins in turn are oxyalkylation-susceptible, water-insoluble, organic solvent-soluble, fusible phenolic resins. Based on actual large scale application in a large number of oil fields in the United States and certain foreign countries, we believe that this type of material, either as such or in the form of derivatives, will ultimately be employed in no less than 50% of all chemical demulsifying agents used throughout the world.

In practicing our process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example by agitating the tank of emulsion and slowly dripping emulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e. g., the bottom of the tank, and re-introduces it into the top of the tank, the demulsifier being added, for example, at the suction side of said circulating pump.

In a second type of treating procedure, the demulsifier is introduced into the well fluids at the well-head or at some point between the well-head and the final oil storage tank, by means of an adjustable proportioning mechanism or proportioning pump. Ordinarily the flow of fluids through the subsequent lines and fittings suffices to produce the desired degree of mixing of demulsifier and emulsion, although in some instances additional mixing devices may be introduced into the flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to intrduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat, and allowing the mixture to stand quiescent until the undesirable water content of the emulsion separates and settles from the mass.

The following is a typical installation:

A reservoir to hold the demulsifier of the kind described (diluted or undiluted) is placed at the well-head where the effluent liquids leave the well. This reservoir or container, which may vary from 5 gallons to 50 gallons for convenience, is connected to a proportioning pump which injects the demulsifier drop-wise into the fluids leaving the well. Such chemicalized fluids pass through the flowline into a settling tank. The settling tank consists of a tank of any convenient size, for instance, one which will hold amounts of fluid produced in 4 to 24 hours (500 barrels to 2000 barrels capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an oil outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:15,000, 1:20,000, or the like.

In many instances the oxyalkylated products herein specified as demulsifiers can be conveniently used without dilution. However, as previously noted, they may be diluted as desired with any suitable solvent. For instance, by mixing 75 parts by weight of an oxyalkylated derivative, for example, the product of Example 1b, with 15 parts by weight of xylene and 10 parts by weight of isopropyl alcohol, an excellent demulsifier is obtained. Selection of the solvent will vary, depending upon the solubility characteristics of the oxyalkylated product, and of course will be dictated in part by economic considerations, i. e., cost.

As noted above, the products herein described may be used not only in diluted form, but also may be used admixed with some other chemical demulsifier. For example, attention is directed to the copending application of Arthur F. Wirtel, Serial No. 8,734, filed February 16, 1948. That application contemplates, among other things, the use of a mixture comprising:

Oxyalkylated derivative, for example, the product of Example 1b, 20%;

A cyclohexylamine salt of a polypropylated naphthalene mono-sulfonic acid, 24%;

An ammonium salt of a polypropylated naphthalene mono-sulfonic acid, 24%;

A sodium salt of oil-soluble mahogany petroleum sulfonic acid, 12%;

A high-boiling aromatic petroleum solvent, 15%;

Isopropyl alcohol, 5%.

The above proportions are all weight percents.

The instant application is concerned with the use of oxyalkylated resinous compounds or derivatives thereof for demulsification of petroleum emulsions of the water-in-oil type. It is obvious that the alicyclic analogues derived by nuclear hydrogenation are equally serviceable for this purpose, and particularly as intermediates for the manufacture of more complex compounds for use as demulsifying agents. In a general way, conversion of the aromatic material to an alicyclic material follows either one or two procedures: One can hydrogenate the resin in a conventional manner, followed by oxyalkylation of the hydrogenated resin in substantially the same manner as is employed in the case of the non-hydrogenated resin. The second procedure is to hydrogenate the oxyalkylated derivative rather than the resin itself. As an example of such procedure, reference is made to our co-pending applications, Serial Nos. 726,201 and 726,204, all filed February 3, 1947, both now abandoned.

Having thus described our invention, what we claim as new and desire to secure by Letters Patent, is:

1. A process for breaking petroleum emulsions of the water-in-oil type characterized by subjecting the emulsion to the action of a demulsifier including a hydrophile oxyalkylated phenolic resin; said phenolic resin being one in which a phenol supplies a resinogen radical by virtue of a nuclear hydrogen atom; said resin being one in which the ratio of oxyalkylene groups to phenolic nuclei is at least 2:1 and the alkylene radicals of the oxylalkylene groups are selected from the group consisting of ethylene, propylene, butylene, hydroxy propylene and hydroxy butylene radicals.

2. A process for breaking petroleum emulsions of the water-in-oil type, characterized by subjecting the emulsion to the action of a demulsifier including hydrophile synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide and methylglycide, and (B) an oxyalkylation-susceptible, fusible, organic solvent-soluble, water-insoluble, phenolic resin; said phenolic resin being one in which a phenol supplies a resinogen radical by virtue of a nuclear hydrogen atom; said oxyalkylated resin being characterized by the introduction into the resin molecule of a plurality of divalent radicals having the formula $(R_1O)_n$ in which $R_1$ is a member selected from the class consisting of ethylene radicals, propylene radicals, butylene radicals, hydroxy propylene radicals, and hydroxy butylene radicals, and $n$ is a numeral varying from 1 to 20; with the proviso that at least 2 moles of alkylene oxide be introduced for each phenolic nucleus.

3. A process for breaking petroleum emulsions of the water-in-oil type, characterized by subjecting the emulsion to the action of a demulsifier including hydrophile synthetic products; said hydrophile synthetic products being oxyalkylation products of (A) an alpha beta alkylene oxide having not more than 4 carbon atoms and selected from the class consisting of ethylene oxide, propylene oxide, butylene oxide, glycide and methylglycide, and (B) an oxyalkylation-susceptible, fusible, organic solvent-soluble, water-insoluble, phenolic resin; said phenolic resin being one in which a phenol supplies a resinogen radical by virtue of a nuclear hydrogen atom; said oxyalkylated resin being characterized by the introduction into the resin molecule of a plurality of divalent radicals having the formula $(R_1O)_n$ in which $R_1$ is a member selected from the class consisting of ethylene radicals, propylene radicals, butylene radicals, hydroxy propylene radicals, and hydroxy butylene radicals, and $n$ is a numeral varying from 1 to 20; with the proviso that at least 2 moles of alkylene oxide be introduced for each phenolic nucleus; and with the final proviso that the hydrophile properties of said oxyalkylated resin in an equal weight of xylene are sufficient to produce an emulsion when said xylene solution is shaken vigorously with one to three volumes of water.

4. A process for breaking petroleum emulsions of the water-in-oil type, characterized by subjecting the emulsion to the action of a demulsifier including hydrophile synthetic products; said hydrophile synthetic products being oxyethylation products of (A) ethylene oxide, and (B)

an oxyethylation-susceptible, fusible, organic solvent-soluble; water-insoluble, phenolic resin; said phenolic resin being one in which a phenol supplies a resinogen radical by virtue of a nuclear hydrogen atom; said oxyethylated resin being characterized by the introduction into the resin molecule of a plurality of divalent radicals having the formula $(C_2H_4O)_n$; wherein $n$ is a numeral varying from 1 to 20; with the proviso that at least 2 moles of ethylene oxide be introduced for each phenolic nucleus; and with the final proviso that the hydrophile properties of said oxyethylated resin in an equal weight of xylene are sufficient to produce an emulsion when said xylene solution is shaken vigorously with one to three volumes of water.

5. A process for breaking petroleum emulsions of the water-in-oil type, characterized by subjecting the emulsion to the action of a demulsifier including hydrophile synthetic products; said hydrophile synthetic products being oxyethylation products of (A) ethylene oxide, and (B) an oxyethylation-susceptible, fusible, organic solvent-soluble, water-insoluble, low-stage phenolic resin; said phenolic resin being one in which a phenol supplies a resinogen radical by virtue of a nuclear atom; said oxyethylated resin being characterized by the introduction into the resin molecule of plurality of divalent radicals having the formula $(C_2H_4)_n$; wherein $n$ is a numeral varying from 1 to 20; with the proviso that at least 2 moles of ethylene oxide be introduced for each phenolic nucleus; and with the final proviso that the hydrophile properties of said oxylethylated resin in an equal weight of xylene are sufficient to produce an emulsion when said xylene solution is shaken vigorously with one to three volumes of water.

6. A process for breaking petroleum emulsions of the water-in-oil type, characterized by subjecting the emulsion to the action of a demulsifier including hydrophile synthetic products; said hydrophile synthetic products being oxyethylation products of (A) ethylene oxide, and (B) an oxyethylation-susceptible, fusible, organic solvent-soluble, water-insoluble, low-stage phenolic resin; said phenolic resin being one in which a phenol supplies a resinogen radical by virtue of a nuclear hydrogen atom; said oxyethylated resin being characterized by the introduction into the resin molecule of a plurality of divalent radicals having the formula $(C_2H_4O)_n$; wherein $n$ is a numeral varying from 1 to 20; with the proviso that at least 2 moles of ethylene oxide be introduced for each phenolic nucleus; said resin being characterized by the fact that phenolic nuclei are attached to different carbon atoms of an interrupted carbon atom chain; and with the final proviso that the hydrophile properties of said oxyethylated resin in an equal weight of xylene are sufficient to produce an emulsion when said xylene solution is shaken vigorously with one to three volumes of water.

7. A process for breaking petroleum emulsions of the water-in-oil type, characterized by subjecting the emulsion to the action of a demulsifier including hydrophile synthetic products; said hydrophile synthetic products being oxyethylation products of (A) ethylene oxide, and (B) an oxyethylation-susceptible, fusible organic solvent-soluble, water-insoluble, low-stage phenolic resin; said phenolic resin being one in which a phenol supplies a resinogen radical by virtue of a nuclear hydrogen atom; said oxyethylated resin being characterized by the introduction into the resin molecule of a plurality of divalent radicals having the formula $(C_2H_4O)_n$; wherein $n$ is a numeral varying from 1 to 20; with the proviso that at least 2 moles of ethylene oxide be introduced for each phenolic nucleus; said resin being characterized by the fact that the phenolic nuclei are attached to different carbon atoms of an oxygen-interrupted carbon atom chain; and with the final proviso that the hydrophile properties of said oxyethylated resin in an equal weight of xylene are sufficient to produce an emulsion when said xylene solution is shaken vigorously with one to three volumes of water.

8. A process for breaking petroleum emulsions of the water-in-oil type, characterized by subjecting the emulsion to the action of a demulsifier including hydrophile synthetic products; said hydrophile synthetic products being oxyethylation products of (A) ethylene oxide, and (B) an oxyethylation-susceptible, fusible, organic solvent-soluble, water-insoluble, low-stage phenolic resin; said phenolic resin being one in which a phenol supplies a resinogen radical by virtue of a nuclear hydrogen atom; said oxyethylated resin being characterized by the introduction into the resin molecule of a plurality of divalent radicals having the formula $(C_2H_4O)_n$; wherein $n$ is a numeral varying from 1 to 20; with the proviso that at least 2 moles of ethylene oxide be introduced for each phenolic nucleus; said resin being characterized by the fact that the phenolic nuclei are attached to sulfur; and with the final proviso that the hydrophile properties of said oxyethylated resin in an equal weight of xylene are sufficient to produce an emulsion when said xylene solution is shaken vigorously with one to three volumes of water.

9. The process of claim 5 wherein the condensation resin is a phenol-urea-formaldehyde resin.

MELVIN DE GROOTE.
BERNHARD KEISER.

REFERENCES CITED

The following references are of record in the file of this patent:

UNITED STATES PATENTS

| Number | Name | Date |
|---|---|---|
| 2,060,410 | Balle | Nov. 10, 1936 |
| 2,076,624 | De Groote | Apr. 13, 1937 |
| 2,243,330 | De Groote et al. | May 27, 1941 |
| 2,278,838 | De Groote et al. | Apr. 7, 1942 |
| 2,307,058 | Moeller | Jan. 5, 1943 |
| 2,317,726 | Boedeker et al. | Apr. 27, 1943 |
| 2,330,474 | De Groote | Sept. 28, 1943 |
| 2,385,970 | De Groote et al. | Oct. 2, 1945 |
| 2,454,541 | Bock et al. | Nov. 23, 1948 |